United States Patent
Modi et al.

(10) Patent No.: US 10,382,392 B2
(45) Date of Patent: Aug. 13, 2019

(54) SYSTEMS AND METHODS FOR NETWORK ADDRESS TRANSLATION

(71) Applicant: Big Switch Networks, Inc, Santa Clara, CA (US)

(72) Inventors: Sudeep Modi, Milpitas, CA (US); Richard Lane, Mountain View, CA (US); Ning Song, Milpitas, CA (US); Mei Yang, Fremont, CA (US); Gregor Maier, Alameda, CA (US); Srinivasan Ramasubramanian, Sunnyvale, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 153 days.

(21) Appl. No.: 15/225,368

(22) Filed: Aug. 1, 2016

(65) Prior Publication Data

US 2018/0034769 A1 Feb. 1, 2018

(51) Int. Cl.
| | |
|---|---|
| *H04L 29/12* | (2006.01) |
| *H04L 12/803* | (2013.01) |
| *H04L 12/931* | (2013.01) |
| *H04L 29/08* | (2006.01) |
| *H04L 12/733* | (2013.01) |
| *H04L 12/70* | (2013.01) |

(52) U.S. Cl.
CPC ...... *H04L 61/256* (2013.01); *H04L 29/08234* (2013.01); *H04L 45/122* (2013.01);
(Continued)

(58) Field of Classification Search
CPC ........... H04L 65/2521; H04L 2012/568; H04L 29/08144; H04L 29/08153;
(Continued)

(56) References Cited

U.S. PATENT DOCUMENTS

| | | | |
|---|---|---|---|
| 7,706,371 B1 * | 4/2010 | Wing | H04L 12/56 370/392 |
| 9,258,272 B1 * | 2/2016 | Durand | H04L 61/2517 |

(Continued)

FOREIGN PATENT DOCUMENTS

| | | |
|---|---|---|
| CN | 101697528 | 11/2011 |
| WO | 2018026662 | 2/2018 |

OTHER PUBLICATIONS

"International Application Serial No. PCT/US2017/044508, International Search Report dated Oct. 20, 2017", 3 pgs.
(Continued)

*Primary Examiner* — Ashley Shivers
(74) *Attorney, Agent, or Firm* — Schwegman Lundberg & Woessner, P.A.

(57) ABSTRACT

Methods, systems, and computer programs are presented for distributing network address translation (NAT) operations to a plurality of network devices on a network. One method includes an operation for identifying, by a controller that controls a network fabric, a plurality of switches in the network fabric, each switch having a module for NAT and being configured to forward packets received at the switch. The controller identifies hosts having at least one internal Internet Protocol (IP) address, and for each of the hosts, the controller selects one of the switches from the plurality of switches for performing the NAT for the host. Further, the controller configures the network fabric to cause the selected switch to perform the NAT for the host to enable the host to communicate with an external network. In case of switch failure, the system reallocates NAT loads to other switches for high availability.

20 Claims, 17 Drawing Sheets

(52) U.S. Cl.
CPC ............ *H04L 47/125* (2013.01); *H04L 49/70* (2013.01); *H04L 61/2514* (2013.01); *H04L 61/2532* (2013.01); *H04L 67/1021* (2013.01); *H04L 67/1029* (2013.01); *H04L 67/1034* (2013.01); *H04L 67/1036* (2013.01); *H04L 2012/568* (2013.01)

(58) Field of Classification Search
CPC ............ H04L 29/08234; H04L 47/125; H04L 67/1002; H04L 67/1004; H04L 49/70; H04L 61/2532; H04L 61/2521
See application file for complete search history.

(56) References Cited

U.S. PATENT DOCUMENTS

| | | | |
|---|---|---|---|
| 2003/0200318 A1* | 10/2003 | Chen | ................ H04L 29/12462 709/227 |
| 2004/0215752 A1 | 10/2004 | Satapati et al. | |
| 2012/0005299 A1* | 1/2012 | Xu | .................... H04L 29/12358 709/208 |
| 2012/0191875 A1* | 7/2012 | Kano | .................... H04L 61/103 709/245 |
| 2015/0281059 A1* | 10/2015 | Xiao | ...................... H04L 45/74 709/238 |

OTHER PUBLICATIONS

"International Application Serial No. PCT/US2017/044508, Written Opinion dated Oct. 20, 2017", 5 pgs.

Li, Yong, "Software-Defined Network Function Virtualization: A Survey", IEEE Access, vol. 3,, (Dec. 9, 2015), 2542-2553.

"International Application Serial No. PCT/US2017/044508, International Preliminary Report on Patentability dated Feb. 14, 2019", 7 pgs.

* cited by examiner

SYSTEMS AND METHODS FOR NETWORK ADDRESS TRANSLATION

TECHNICAL FIELD

The subject matter disclosed herein generally relates to methods, systems, and programs for managing network address translation on a network fabric.

BACKGROUND

Network address translation (NAT) is a mechanism for managing the shortage of Internet protocol (IP) version 4 addresses. NAT enables devices on a private network to utilize private IP addresses, and when these devices need to communicate with other devices outside the private network, a router translates the private IP addresses into public IP addresses as network packets travel through the router from the private network to the public network.

However, NAT operations on a centralized device (e.g., the router) may tax resource utilization on the device and cause network performance problems. Further, the device may become a bottleneck for network traffic and a failure on the device may be catastrophic for the performance of the network.

It is in this context that embodiments arise.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
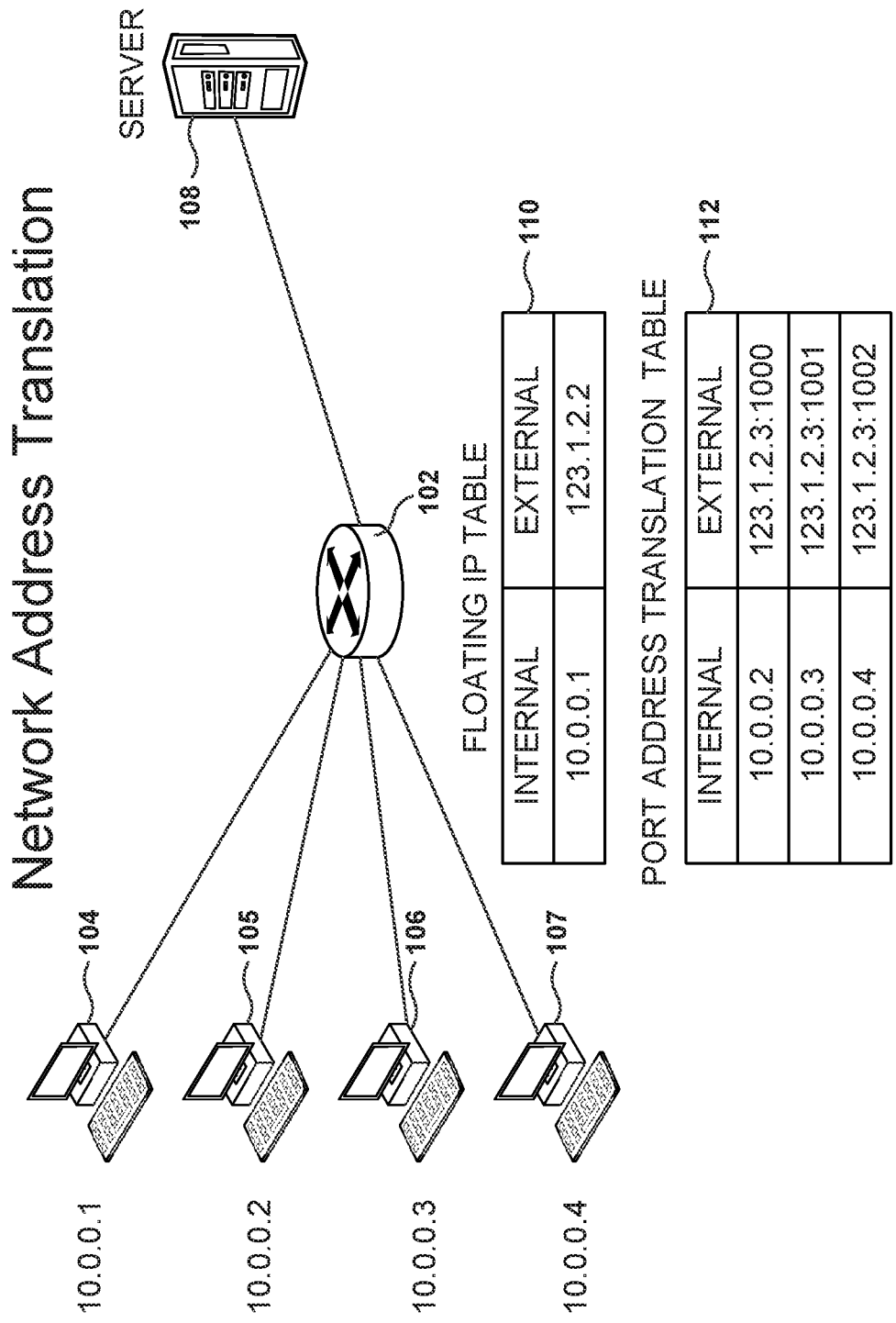
FIG. 1 illustrates operations for network address translation (NAT), according to some example embodiments.

Example methods, systems, and computer programs are presented for distributing network address translation (NAT) operations to a plurality of network devices on a network. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some implementations, a network administrator has to configure a plurality of network devices for performing NAT in order to distribute NAT operations throughout the network for better resource management. The plurality of network devices is referred to as a NAT pool.

In some example embodiments, a controller server manages the network fabric configuration for a plurality of network devices, and the controller server designates which devices perform NAT for which hosts (e.g., physical devices or virtual machines), without requiring express configuration by a network administrator, although partial configuration by the network administrator is also possible. The controller server performs load balancing across all the devices in the NAT pool to optimize the performance of the network, for example, by reducing the amount of linked traffic associated with NAT packets. In one example embodiment, the assignment of a NAT device to a host is based not only on the load on the devices in the NAT pool, but also on the locations of the host and the NAT devices.

Example embodiments presented herein include switches performing floating IP NAT and Port Address Translation (PAT) NAT (details provided below with reference to FIG. 1) in a distributed manner. For example, a virtual switch executing on a server may be linked to a virtual switch executing on the same server for performing NAT. Further, example embodiments illustrate how to automatically redistribute NAT-related traffic when a switch becomes unavailable, either because of failure or planned system downtime.

One general aspect includes a method including an operation for identifying, by a controller that controls a network fabric, a plurality of switches in the network fabric. In one example embodiment, a network administrator configures which switches on the network are defined for performing NAT, and there may be other switches on the network that do not perform NAT. Each switch has a module for NAT, where each switch is configured for forwarding packets received at the switch. The controller identifies one or more hosts having at least one internal IP address. For each of the one or more hosts, the controller selects one of the switches from the plurality of switches for performing the NAT for the host. Further, the controller configures the network fabric to cause the selected switch to perform the NAT for the host to enable the host to communicate with an external network.

One general aspect includes a non-transitory machine-readable storage medium including instructions that, when executed by a machine, cause the machine to perform operations including identifying, by a controller that controls a network fabric, a plurality of switches in the network fabric, each switch having a module for NAT, where each switch is configured for forwarding packets received at the switch. The controller identifies one or more hosts having at least one internal IP address. For each of the one or more hosts, the controller selects one of the switches from the plurality of switches for performing the NAT for the host. Further, the controller configures the network fabric to cause the selected switch to perform the NAT for the host to enable the host to communicate with an external network.

One general aspect includes a controller including a network interface, a memory including instructions, and one or more computer processors. The instructions, when executed by the one or more computer processors, cause the one or more computer processors to perform operations including identifying a plurality of switches in a network fabric, each switch having a module for NAT, where each switch is configured for forwarding packets received at the switch. The controller identifies one or more hosts having at least one internal IP address. For each of the one or more hosts, the controller selects one of the switches from the plurality of switches for performing the NAT for the host. Further, the controller configures the network fabric to cause the selected switch to perform the NAT for the host to enable the host to communicate with an external network.

Details regarding network switches, including virtual switches and virtual routers, are provided in U.S. patent application Ser. No. 14/142,283 entitled "Systems and Methods for Performing Network Service Insertion," filed on Dec. 27, 2013, which is herein incorporated by reference in its entirety.

FIG. 1 illustrates operations for network address translation (NAT), according to some example embodiments. NAT is a method of remapping one Internet Protocol (IP) address space into another IP address space by modifying network address information in IP datagram packet headers while the packets are in transit across a router 102. In some implementations, NAT is carried out in the router 102 utilizing a floating IP table 110 and a port address translation (PAT) table 112 to map the internal IP addresses into an external IP address or an external IP address and a port. In general, an internal network is managed by a single entity and an internal IP address is an IP address that is used within the boundaries of the internal network. Since the internal IP addresses are valid within the internal network, the internal IP addresses may be reused by many entities, without having to use external IP addresses. An external IP address is an IP address that is valid outside the internal network for routing packets. For example, an external IP address is a valid IP address that may be used to route packets in the Internet.

As packets arrive to the router 102, the router 102 changes the source IP address on the packets to simulate that the packets originate from the router 102. In the reverse communications path, responses are mapped back to the originating internal IP addresses using the state stored in the floating IP table 110 and the PAT table 112.

For example, a web browser in the internal network can browse a website in the external network (e.g., Internet), but a web browser in the external network could not browse a web site hosted within the internal network. However, some NAT devices allow the network administrator to configure translation table entries for permanent use, a feature referred to as floating IP or static NAT, which allows traffic originating in the external network to reach designated hosts in the internal network.

There are two types of NAT: floating IP and PAT. Floating IP provides a one-to-one translation of one internal IP address to one external IP address. Floating IP is also referred to as basic NAT or one-to-one NAT. PAT permits multiple devices on the internal network to be mapped to a single external IP address, and each device is mapped to a different port number. When using PAT, the router maintains unique source port numbers on the inside global IP address to distinguish between translations.

In the example illustrated in FIG. 1, the router 102 is performing floating IP NAT and PAT NAT. There are four clients 104-107 sending packets through the router 102 (e.g., to a server 108 on an external network). Their respective addresses are 10.0.0.1, 10.0.0.2, 10.0.0.3, and 10.0.0.4. In this example scenario, the client 104 is using a floating IP address, and the IP address 10.0.0.1 is mapped to an external address 123.1.2.2. The clients 105-107 are using PAT NAT and the clients 105-107 share an external IP address 123.1.2.3, but the clients 105-107 are mapped to respective ports 1000, 1001, and 1002.

The router 102 includes the floating IP table 110 and the PAT table 112. The floating IP table 110 stores one-to-one mappings of one internal IP address (e.g., 10.0.0.1) to one external IP address (e.g., 123.1.2.2). The PAT table 112 maps one internal IP address to the corresponding combination of external IP address plus port. In one example embodiment, a large number of virtual machines may share the same external IP address by changing the port in the PAT table 112.

Figure 2:
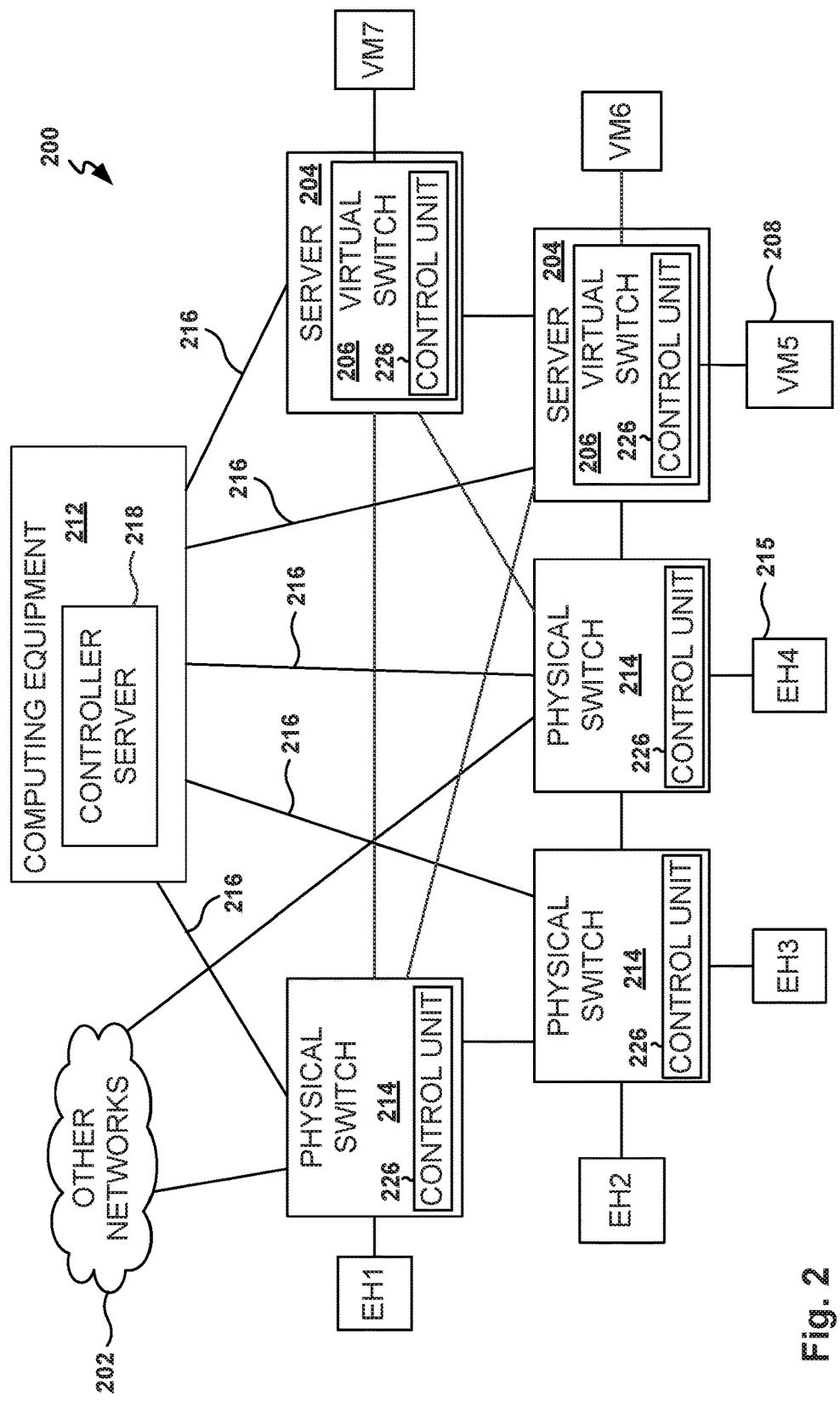
FIG. 2 is a block diagram illustrating a multi-vendor network architecture, according to an example embodiment.

FIG. 2 is a block diagram illustrating a multi-vendor network architecture, according to an example embodiment. The network architecture is illustrated by a network 200 that provides for centralized control. The network 200 includes computing equipment 212, such as a controller server 218; one or more switches; and one or more end hosts (EH) 215. There are two types of switches: physical switches 214 and virtual switches 206. The physical switches 214 are hardware computing devices, and the virtual switches 206 are switches implemented in software within a computing device, such as servers 204, as described in more detail below with reference to FIG. 3. As used herein, the generic term "switch" is utilized to describe the functionality of both physical switches and virtual switches, unless otherwise specified.

The controller server 218 is communicatively coupled via network links 216 to control units 226, in the physical switches 214 and the virtual switches 206, to implement a network configuration and to perform other types of centralized control. It is noted that the network links 216 may include a direct connection or a network connection through intermediate network devices (including other switches that may be in the same local network or in other networks 202). The switches, also referred to as packet forwarding systems, network switches, or packet processing systems, include input-output ports utilized to communicatively couple the switches to other switches, or to the controller server 218, or to other networks 202. The switches further include additional input-output ports utilized to communicatively couple the switches to the end hosts 215 (e.g., EH1, EH2, EH3, etc.). The end hosts 215 communicate, via the switches 214 and 206, with each other or with other computing devices connected to the network 200.

Multi-vendor networks such as the network 200, the Internet, and the local and regional networks coupled to the Internet, rely on switches that are packet-based. These switches can forward packets based on embedded address information. Packet sources and destinations may include the end hosts 215 (e.g., EH1, EH2, EH3, etc.) and virtual machines (e.g., a virtual machine (VM) 208). Examples of end hosts 215 are personal computers, servers, and other computing equipment such as portable electronic devices that access the network using wired or wireless technologies.

Network switches (e.g., physical switches 214) in multi-vendor networks range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet-forwarding network, but the network can be difficult to manage in a centralized fashion due to incompatibilities between different operating systems and control protocols.

These potential incompatibilities can be overcome by incorporating a common cross-platform control unit 226, also referred to herein as a controller client or control module, into each switch. A centralized cross-platform controller, such as the controller server 218, may interact with each of the control units 226 over respective network links 216. The use of the cross-platform controller server 218 and control units 226 allows potentially disparate network equipment to be centrally managed.

In a typical network environment, one or more controller servers interface with one or more switches to manage the network traffic. For example, an active controller server may be managing the network traffic while a standby controller server is in place, just in case the active controller server becomes inoperative. The infrastructure in place for managing a plurality of network devices is referred to herein as the control plane.

Figure 3:
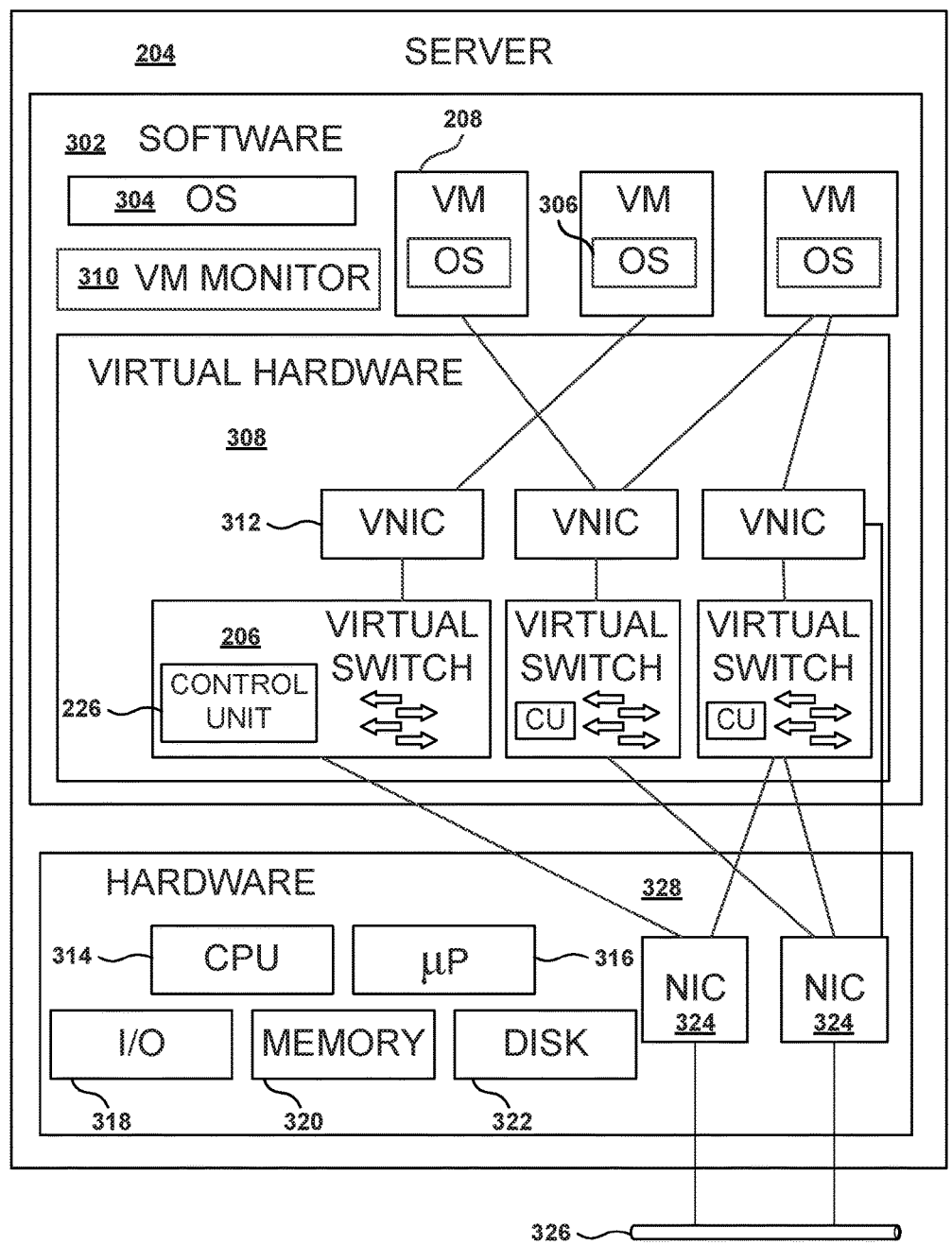
FIG. 3 illustrates a diagrammatic representation of a server, according to an example embodiment, that hosts virtual machines.

FIG. 3 illustrates a diagrammatic representation of a server 204, according to an example embodiment, that hosts virtual machines. The server 204 includes software 302 and hardware 328. The software 302 includes an operating system (OS) 304 and a virtual machine monitor (VMM) 310, also referred to as a hypervisor, which is a piece of computer software (as illustrated in FIG. 3) that creates and runs virtual machines 208, also referred to as guest machines. In other example embodiments, the VMM 310 may be any combination of software, firmware, and hardware that runs the virtual machines 208.

The VMM 310 presents guest operating systems 306 to the virtual machines 208 as a virtual operating platform, and the VMM 310 manages the execution of the guest operating systems 306. The VMM 310 presents a virtual hardware 308 platform to the virtual machines 208, and any physical hardware component may be virtualized to provide virtual hardware 308 to the virtual machines 208. For example, as illustrated in FIG. 3, the virtual hardware 308 includes one or more virtual network interface cards (VNICs) 312, which virtualize a network interface card (NIC). The VNIC 312 may be logically coupled to a virtual switch 206 or to a NIC 324, which is part of the hardware 328. Multiple instances of a variety of operating systems may share the virtual hardware 308.

The virtual switch 206 virtualizes a switch that is able to forward packets. In some example embodiments, the virtual switch 206 forwards packets at layer 2 or layer 3 of the ISO network model. The virtual switch 206 may include a control unit 226 that interfaces with the controller server 218 for management of the network fabric. More details regarding the operation of the virtual switch 206 and the control unit 226 are provided below with reference to FIGS. 5-10.

The hardware 328 includes hardware components, such as a CPU 314, microprocessor 316, Input/Output (I/O) devices 318, memory 320, disk storage 322, and NIC 324, which may be connected to one or more networks 326. More details regarding the server 204 platforms are provided below, in FIG. 16 for the software platform and in FIG. 17 for the hardware platform.

Figure 4:
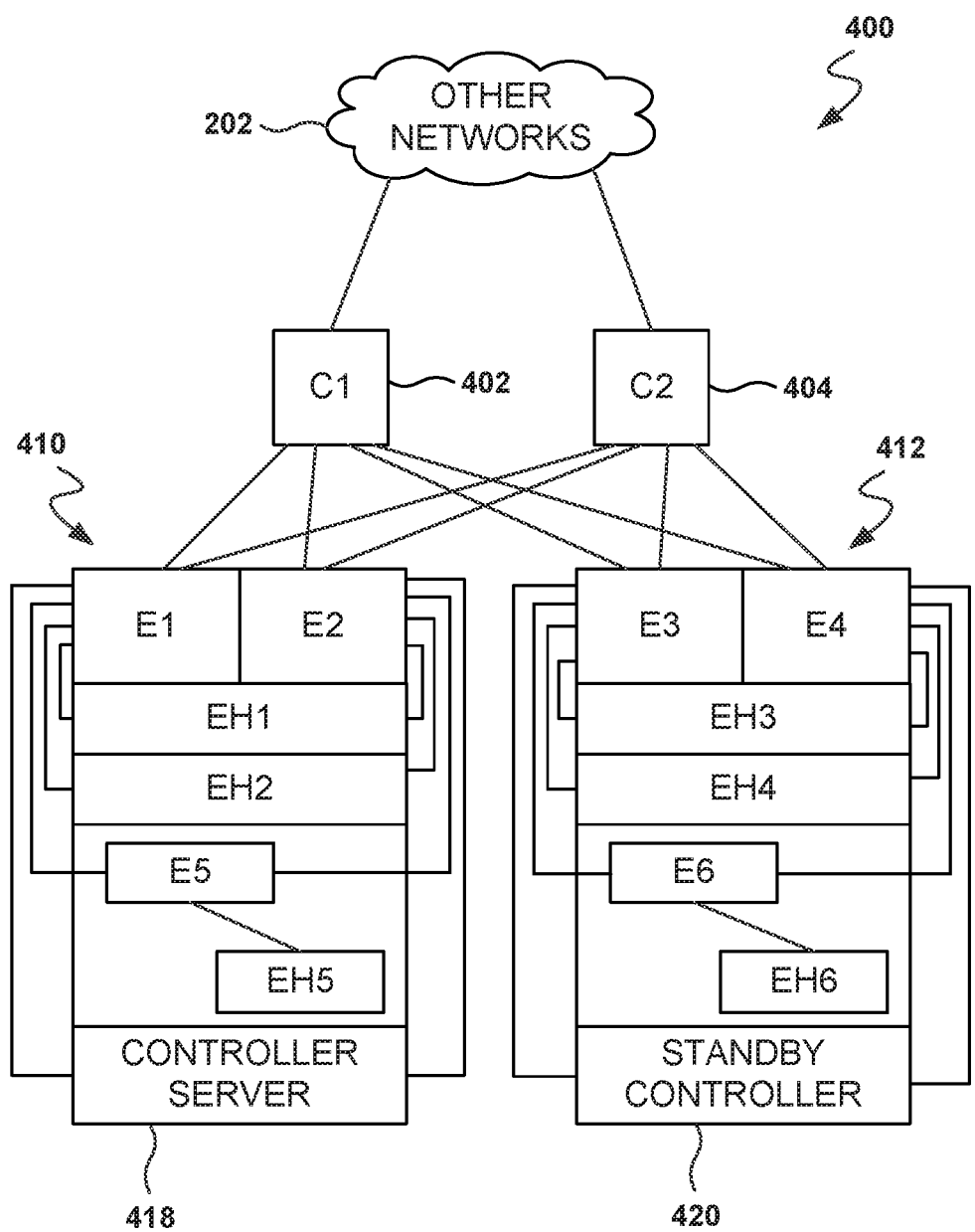
FIG. 4 is a diagram of an illustrative rack-based system, according to some example embodiments, that implements a network having switches that may be controlled by a controller server to perform NAT.

FIG. 4 is a diagram of an illustrative rack-based system, according to some example embodiments, that implements a network 400 having switches that may be controlled by a controller server to perform NAT. The network 400 is implemented using rack-based systems. Network racks 410 and 412 include top-of-rack switches E1-E4, end hosts EH1-EH6, virtual switches E5-E6, a controller server 418, and a standby controller 420. The network racks 410 and 412 are coupled to core switches 402 and 404.

Edge switches E1, E2, E3, and E4 serve as top-of-rack switches that are coupled via network paths to end hosts of the corresponding network rack. For example, top-of-rack switch E3 is connected to the end hosts of the network rack 412 (e.g., end hosts EH3, EH4, and EH6). Each top-of-rack switch serves as an interface between end hosts of the corresponding network rack and other network devices such as other portions of the network 400 or other networks 202. Network traffic to or from end hosts of the network rack 410 may traverse at least one of the top-of-rack switches of the network rack 410 (e.g., top-of-rack switches E1 and E2). Similarly, network traffic of the network rack 412 may traverse at least one of switches E3 and E4.

If desired, switches may be implemented using computing equipment of the network racks 410 and 412. Switch E5 may be implemented using computing equipment such as a line card of the network rack 410, or switch E5 may be embodied as a virtual switch. Virtual switch E5 may sometimes be referred to as a hypervisor switch. Virtual switches may be implemented using dedicated circuitry or using software on discrete computing equipment (e.g., on a line card). However, in some example embodiments, such virtual switches are coupled to the rest of the network by cables plugged into dedicated physical ports of the computing equipment on which the virtual switch is implemented.

Virtual switch E5 may interface with end hosts, such as end host EH5, and the controller server 418. In other words, shared computing equipment may be used to implement switch E5, end host EH5, and the controller server 418. If desired, virtual machines may be implemented in software on the shared computing equipment.

Further, the controller server 418 may be implemented in the network rack 410 (e.g., using the resources of a line card or other computing equipment of the network rack 410). The controller server 418 may communicate with the top-of-rack switches and core switches by sending control packets to and receiving control plane packets from the switches. In this scenario, one or more switches of the network 400 may form portions of the network links 216 of FIG. 2.

The controller server 418 may be configured to implement a logical network topology of virtual routers and virtual switches over the underlying physical network topology. The logical network topology may provide benefits such as improved network configuration efficiency, flexibility, and capabilities. A standby controller 420 is hosted in the network rack 412, and the standby controller 420 may take over network management functions if the controller server 418 becomes unavailable.

Figure 5:
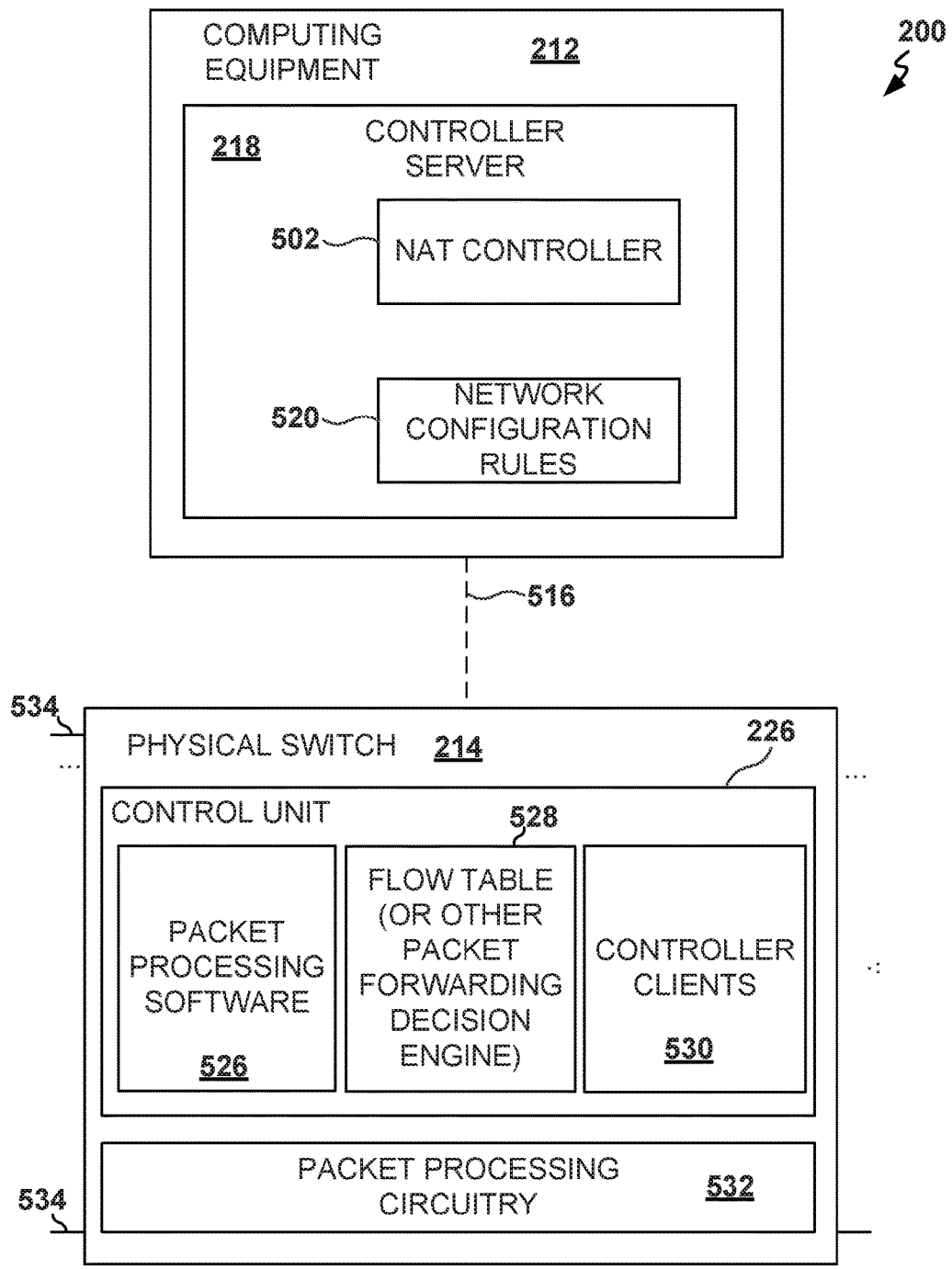
FIG. 5 is a block diagram of a network, according to an example embodiment.

FIG. 5 is a block diagram of the network 200, according to an example embodiment. The network 200 provides centralized control and includes one or more controller servers 218 and physical switches 214, according to an example embodiment. The controller server 218 may be implemented on a standalone computer, on a cluster of computers, on a set of computers that are distributed among multiple locations, on hardware that is embedded within a network switch, or on other suitable computing equipment 212. The controller server 218 can run as a single process on a single computer or can be distributed over several hosts for redundancy. The use of a distributed arrangement may help provide the network 200 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is connected to a first controller node, that first controller node may use the control plane by using the intra-controller protocol to inform other controller nodes of the presence of the new end host. If desired, a switch or other network component may be connected to multiple controller nodes. Arrangements in which a single controller server is used to control a network of associated switches are sometimes described herein as an example embodiment.

The controller server 218 may gather information about the topology of the network 200. For example, the controller server 218 may send Link Layer Discovery Protocol (LLDP) probe packets through the network 200 to discover the topology of the network 200. The controller server 218 may use information on network topology and information on the capabilities of network equipment to determine appropriate paths for packets flowing through the network 200. Once appropriate paths have been identified, the controller server 218 may send corresponding setting data to the hardware in the network 200 to ensure that packets flow through the network 200 as desired.

A NAT controller 502 manages NAT operations that are distributed across a plurality of network devices in the network 200 (e.g., physical switch 214, or network routers). The NAT controller 502 identifies the hosts in the network 200 that need NAT to communicate with other hosts, and the NAT controller 502 determines what devices will perform the NAT for the different hosts.

By distributing NAT operations, network performance is improved by doing NAT at the best possible switch (or one of the best possible switches). Network performance is also improved by decreasing the amount of network traffic that would be necessary if all NAT requests would have to be sent to the same network device. For example, the NAT controller 502 may determine where NAT is performed based on the load of the network and the available bandwidth.

Further, in some example embodiments, the network administrator is able to configure where NAT is performed (e.g., in which switches), so the network administrator uses a custom configuration for NAT loads in order to improve network performance. Instead of having one single device performing NAT, the network administrator is able to configure NAT operations at a plurality of network devices to configure NAT at a network level, at a group level, or at the individual host level.

In some example embodiments, the network administrator enters a desired NAT load for one or more switches, and the NAT controller manages NAT loads on the switches to keep the NAT loads below the NAT loads configured by the network administrator. In switches where no NAT-load configuration is entered by the network administrator, the NAT controller will distribute the NAT load based on the capacity and location of the switches.

In some network environments, when a network upgrade takes place, the network administrator has to manually configure all the new routers and switches in order to redirect NAT operations to the desired service points. However, the example embodiments presented herein describe how to transparently configure the network, without having a configuration entered by a network administrator, in order to efficiently perform NAT operations at a plurality of switches on the network.

The controller server 218 may be used to implement network configuration rules 520. The network configuration rules 520 may specify which services (e.g., NAT) are available to various network entities. As an example, the network configuration rules 520 may specify which users (or type of users) in the network 200 may access a particular server. As another example, the network configuration rules 520 may include service insertion policies identifying network traffic and services that are to be performed on the identified network traffic. The network configuration rules 520 may, for example, be maintained in a database at the computing equipment 212.

The controller server 218 and controller clients 530 at respective physical switches 214 (or virtual switches) may use network protocol stacks to communicate over network paths 516. Each physical switch 214 may have input-output ports 534 (sometimes referred to as network switch interfaces). Cables may be used to connect equipment to the input-output ports 534.

Packet processing circuitry 532 may be used in forwarding packets between the input-output ports 534 and may be used in performing other suitable actions on incoming packets. In some example embodiments, the packet processing circuitry 532 may be implemented using one or more integrated circuits such as dedicated high-speed switch circuits and may serve as a hardware data path. If desired, packet-processing software 526, that is running on a control unit 226, may be used in implementing a software data path.

The control unit 226 may include processing and memory circuits (e.g., one or more microprocessors, memory chips, and other control circuitry) for storing and running control software. For example, the control unit 226 may store and run software such as the packet-processing software 526, may store a flow table 528, and may be used to support the operation of the controller clients 530.

The controller clients 530 and the controller server 218 may be compliant with a network switch protocol such as the OpenFlow protocol (see, e.g., OpenFlow Switch Specification version 1.0.0 or 1.3.1, or other versions of the OpenFlow protocol). One or more clients among the controller clients 530 may also be compliant with other protocols (e.g., the Simple Network Management Protocol). Using the OpenFlow protocol or other suitable protocols, the controller server 218 may provide the controller clients 530 with data that determines how the physical switch 214 is to process incoming packets from the input-output ports 534.

In one suitable arrangement, flow table data from the controller server 218 may be stored in the flow table 528, which may be used in configuring the physical switch 214

(e.g., the functions of the packet processing circuitry 532 and/or packet processing software 526).

Any desired packet-forwarding system (e.g., physical switches, virtual switches) may be provided with controller clients that communicate with, and are controlled by, a controller server. For example, the physical switch 214 may be implemented using a general purpose processing platform that runs control software and that omits the packet processing circuitry 532. As another example, the physical switch 214 may be implemented using control circuitry that is coupled to one or more high-speed switching integrated circuits ("switch ICs"). As yet another example, the physical switch 214 may be implemented as a line card in a rack-based system having multiple line cards each with its own packet processing circuitry. The controller server 218 may, if desired, be implemented on one or more line cards in the rack-based system, in another rack-based system, or on other computing equipment that is coupled to the network 200.

Figure 6:
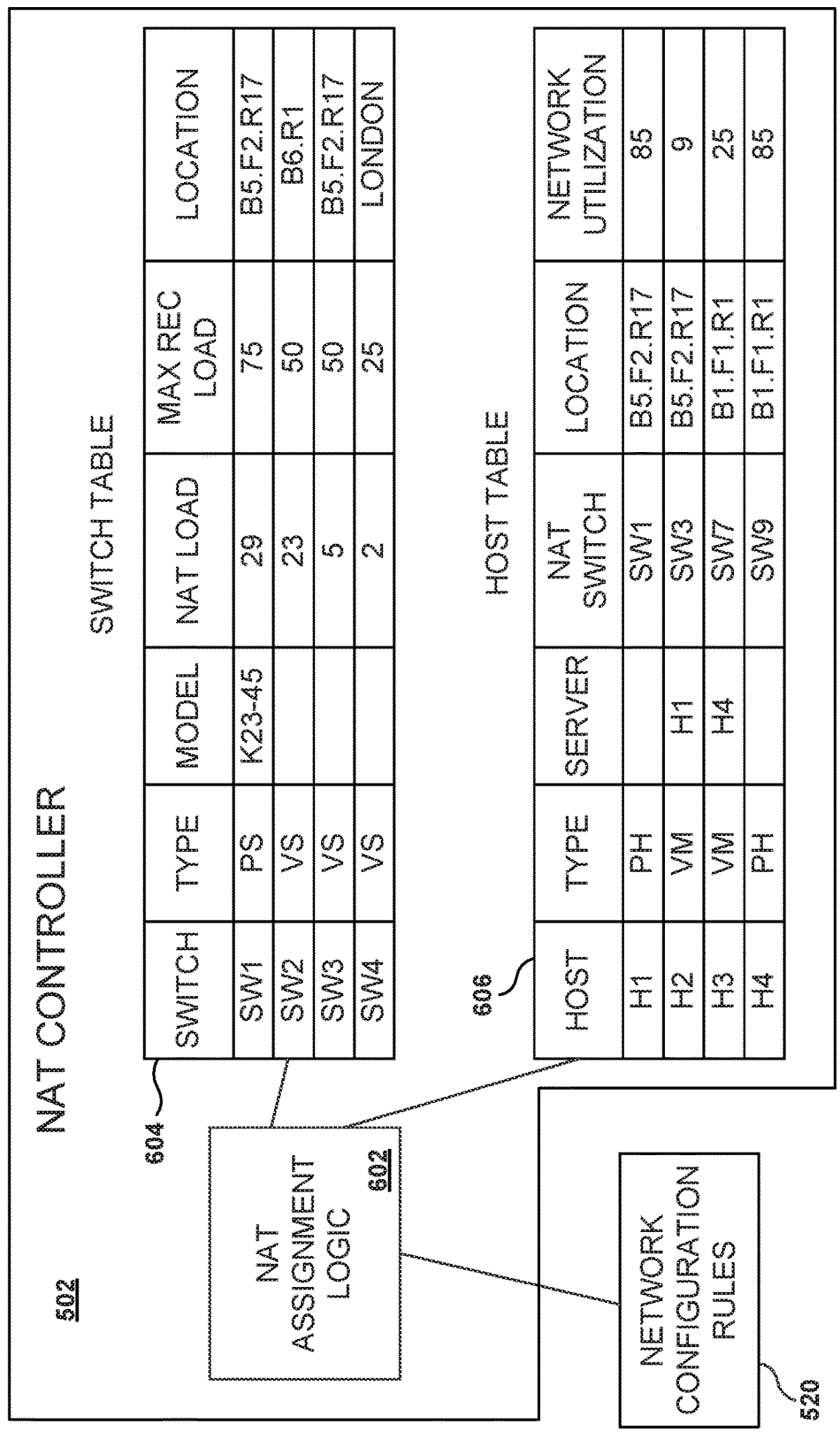
FIG. 6 illustrates data tables, according to some example embodiments, used by the NAT controller to manage the distribution of NAT operations.

FIG. 6 illustrates data tables, according to some example embodiments, used by the NAT controller 502 to manage the distribution of NAT operations. The NAT controller 502 manages the NAT operations on the network fabric, which includes selecting which network device from the NAT pool will perform NAT operations for each of the hosts on the network fabric. A data center may have multiple tenants, where each tenant is a logical grouping of segments (e.g., one or more VLANs), and each tenant may have its own NAT configuration, so that the NAT controller 502 has to manage NAT operations for all the tenants.

In some example embodiments, the NAT controller 502 includes NAT assignment logic 602, a switch table 604, and a host table 606. The switch table 604 includes information about network switches, both physical and virtual switches. In one example embodiment, the switch table 604 includes one or more of the following fields: a switch identifier (e.g., SW1) that uniquely identifies a switch; a type of switch (e.g., physical switch or virtual switch); a switch model (e.g., manufacturer's model number); a NAT load, which is the number of hosts configured to have NAT performed by the switch; a maximum recommended load, which is the maximum recommended NAT load on a given switch (since switches might have more or less capacity, the maximum recommended load provides an indication of the capacity of the switches for better resource allocation); and a location, which is an indication of the physical location of the switch (e.g., B5.F2.R17, which means building 5, floor 2, and rack 17).

The host table 606 includes information about the hosts on the network. In one example embodiment, the host table 606 includes one or more of a host identifier (e.g., H1); a type of host (e.g., physical host or virtual machine); if the type is a virtual machine, a server where the virtual machine is executed (e.g., host H1); a NAT switch configured to perform NAT for this host (e.g., switch SW1); a location (which can be the location of the host or, for a virtual machine, the location of the host where the virtual machine is executed); and a network utilization, a parameter that indicates the level of network activity for a host and is used to determine which hosts will generate more NAT requests.

In some example embodiments, a simple algorithm may be used, such as round robin, to map hosts to NAT services (e.g., switches performing NAT operations). In other example embodiments, the NAT controller 502 assigns NAT switches to hosts based on one or more of the NAT load on each switch NL, the network distance ND from hosts to switches, the resource utilization RU on each switch (e.g., processor utilization, switching fabric utilization, memory utilization), the resource capacity C on each switch, and the physical distance PD between the switches and the computing device associated with each host. In one example embodiment, to determine which switch should be assigned NAT operations for a host, a score is calculated for each potential switch according to the following equation:

$$S_i = \alpha NL + \beta ND + \gamma RU + \delta C + \varepsilon PD$$

Where $\alpha$, $\beta$, $\gamma$, $\delta$, and $\varepsilon$ are parameters tunable by the system according to the effect of the respective variable on the performance of the network. After the scores are calculated for the candidate switches, the switch with the lowest score is selected for performing NAT for the host.

The network distance, sometimes referred to as simply "distance," is an indicator of the proximity between a switch and a host. In one example embodiment, the network distance is measured as the number of network hops between the host (e.g., virtual machine) and the switch, but other embodiments may use other distance indicators. For example, virtual switches executing on the same host as a virtual machine will be given a higher priority than other virtual switches executing on other hosts, or virtual switches executing on a host within the same rack as the virtual machine will be given a higher priority than other virtual switches executing on hosts within other racks.

In one example embodiment, switch selection is performed with the goal of load-balancing NAT in order to evenly distribute NAT loads within the NAT pool. In another example embodiment, switch selection is based on available NAT resources at the switches, and, for example, the switch with the most available resources will be selected when configuring a new virtual switch for NAT.

In another example embodiment, switch selection is based on the network distance from the switch to the host or virtual machine; for example, the closest switch in the NAT pool may be selected for any given host. If a switch far away (e.g., several network hops away) from a virtual machine were selected for NAT operations, then the traffic for the virtual machine would have to travel all the way to the switch when a packet needs NAT. This increases network traffic and decreases the available network bandwidth on the fabric. However, if network distance is used as a factor for selecting a switch from the NAT pool, traffic on the network will be reduced by having NAT performed at the switch closer to the host or virtual machine.

In one example embodiment, if the NAT controller 502 is configuring a new virtual machine that resides in a certain rack, the NAT controller 502 checks the switch table 604 to see if there is a switch located in the same rack as the virtual machine, and if one or more switches are found in the same rack, then the switch in the same rack is assigned to the new virtual machine for performing NAT. In another example embodiment, the NAT controller 502 checks to see if there is a virtual switch implemented in the same host as the new virtual machine, and if there are one or more virtual switches in the same host, the NAT controller 502 selects the virtual switch in the host with the lowest NAT load.

In one example embodiment, once the NAT assignment logic 602 determines the location where NAT will be performed, the network configuration rules 520 are configured to be propagated to the different network switches in order to implement the distributed NAT service.

In some example embodiments, the NAT controller 502 may configure NAT redundancy in the switches by allowing more than one switch to perform NAT on the packets originating at a given host. For example, the NAT controller 502 may configure two switches to perform NAT on the packets from a virtual machine, as soon as any switch receives a packet from the virtual machine. The redundancy may save network resources by performing NAT on the packet as soon as possible, instead of having to forward the packet to another switch for NAT.

Further yet, in some example embodiments, one or more switches may be configured to perform NAT on any packet arriving at the switch that needs NAT. For example, a high-capacity switch may be configured to perform NAT for any packet that arrives at the switch because the switch is not expected to be a resource bottleneck that could slow down the network.

In some example embodiments, if the host is attached to a switch that performs NAT, and a floating IP NAT is to be performed for that host, there is no need to redirect traffic to a separate device. In this case floating IP NAT is performed by the device itself. If a host is attached to a device that is incapable of performing NAT or if PAT is needed, then traffic that needs to be translated may be redirected to the designated NAT device. This is achieved by the controller server, which automatically programs the fabric to redirect traffic to the NAT device.

Figure 7:
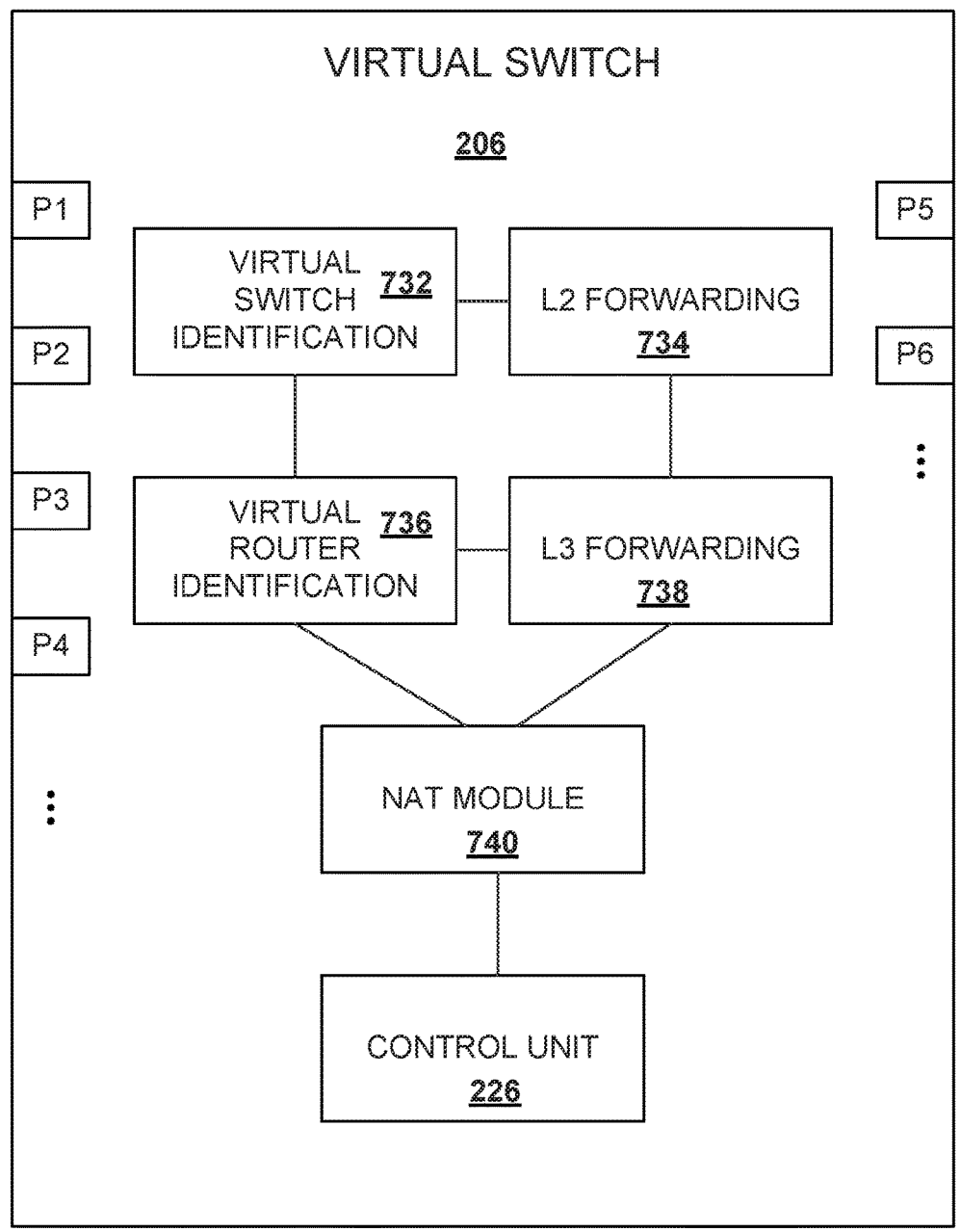
FIG. 7 is a diagram of a switch, according to some example embodiments, having modules that perform packet-forwarding operations.

FIG. 7 is a diagram of a switch, according to some example embodiments, having modules that perform packet-forwarding operations. FIG. 7 is an illustrative block diagram of a virtual switch 206, but the same components may be available in a physical switch. The virtual switch 206 may include ports such as ports P1-P6, a virtual switch identification module 732, an L2 (layer 2) forwarding module 734, a virtual router identification module 736, an L3 (layer 3) forwarding module 738, a NAT module 740, and a control unit 226. The modules may be implemented using respective dedicated circuitry, may be implemented using shared dedicated circuitry, or may be implemented using software on processing circuitry.

It is noted that the physical switches and virtual switches described in the exemplary embodiments may perform layer-2 packet switching and layer-3 packet switching (e.g., routing), although some switches may perform one of layer-2 packet switching or layer-3 packet switching.

A network packet received at one of the switch ports P1-P6 may be processed by one or more of the modules in determining how to process the network packet. The modules may process the network packet in any desired sequence or in parallel. The operations performed by each module may be controlled by a controller.

The NAT module 740 performs NAT by modifying the IP address on the packets traveling through the virtual switch 206, as described above with reference to FIG. 1. The NAT module 740 interacts with the virtual router identification module 736 and L3 forwarding module 738 to perform NAT, when needed, on the packets being routed through the virtual switch 206. In addition, the NAT module 740 interacts with the control unit 226, which interacts with the controller server 218 of FIG. 2, to implement the distributed, global NAT allocation of switches to hosts. In some example embodiments, the NAT module 740 may perform NAT on a packet, even if the switch is not configured to perform NAT for that particular packet, but NAT is necessary for routing the packet. This enables the network fabric to perform NAT even though the configuration of switches or hosts for NAT operations may not be complete.

The virtual switch identification module 732 may determine which virtual switch the network packet is assigned to based on network attributes associated with the network packet (e.g., incoming port, source address information such as Ethernet or IP source address, etc.). The virtual switch identification module 732 may provide information identifying the virtual switch to the L2 forwarding module 734. The L2 forwarding module 734 may perform network forwarding based on the virtual switch information provided by the virtual switch identification module 732 (e.g., forwarding decisions at layer 2 of the Open Systems Interconnection (OSI) model). For example, the L2 forwarding module 734 may determine which switch port the network packet should be forwarded to based on the virtual switch information and additional packet information such as a destination media access control (MAC) address retrieved from the network packet.

In scenarios in which the destination end host is associated with a different virtual switch than the source end host, the virtual router identification module 736 and L3 forwarding module 738 may be used. For example, network packets received by switch E3 (see FIG. 4) from end host EH3 that are destined for end host EH1 may be processed using the L3 forwarding module 738, because end host EH3 is assigned to virtual switch VSW1, whereas end host EH1 is assigned to virtual switch VSW2. In other words, the IP domain of interface IF1 that is associated with end host EH3 is different from the IP domain of interface IF2 that is associated with end host EH1. In these scenarios, network routing at the IP layer (e.g., level 3 of the OSI model) may be performed.

The virtual router identification module 736 may identify which virtual router should be used to process the network packet. The virtual router identification module 736 may use network attributes of the network packet along with information received from other modules of the switch. For example, the virtual router identification module 736 may use identified virtual switch information received from the L2 forwarding module 734 along with IP address information retrieved from the network packet in determining which virtual router processes the network packet.

The modules of the switch may collectively implement a flow table for the switch. For example, flow table entries operating on layer-2 header fields may be implemented using the virtual switch identification module 732 and L2 forwarding module 734. As another example, flow table entries operating on layer-3 header fields may be implemented using the virtual router identification module 736 and L3 forwarding module 738. As yet another example, flow table entries operating on both layer-2 and layer-3 header fields may be implemented using the virtual switch identification module 732, L2 forwarding module 734, virtual router identification module 736, L3 forwarding module 738, and NAT module 740.

The example of FIG. 7 in which modules 732, 734, 736, 738, 740, and 226 are implemented separately is merely illustrative. If desired, the functions of any two or more modules may be merged and implemented using shared circuitry. The modules may be implemented as software modules in a software switch or may be implemented using dedicated circuitry. Each virtual switch 206 may be capable of performing both network forwarding and network routing, which helps to allow a controller server to implement distributed virtual switches and virtual routers.

Figure 8:
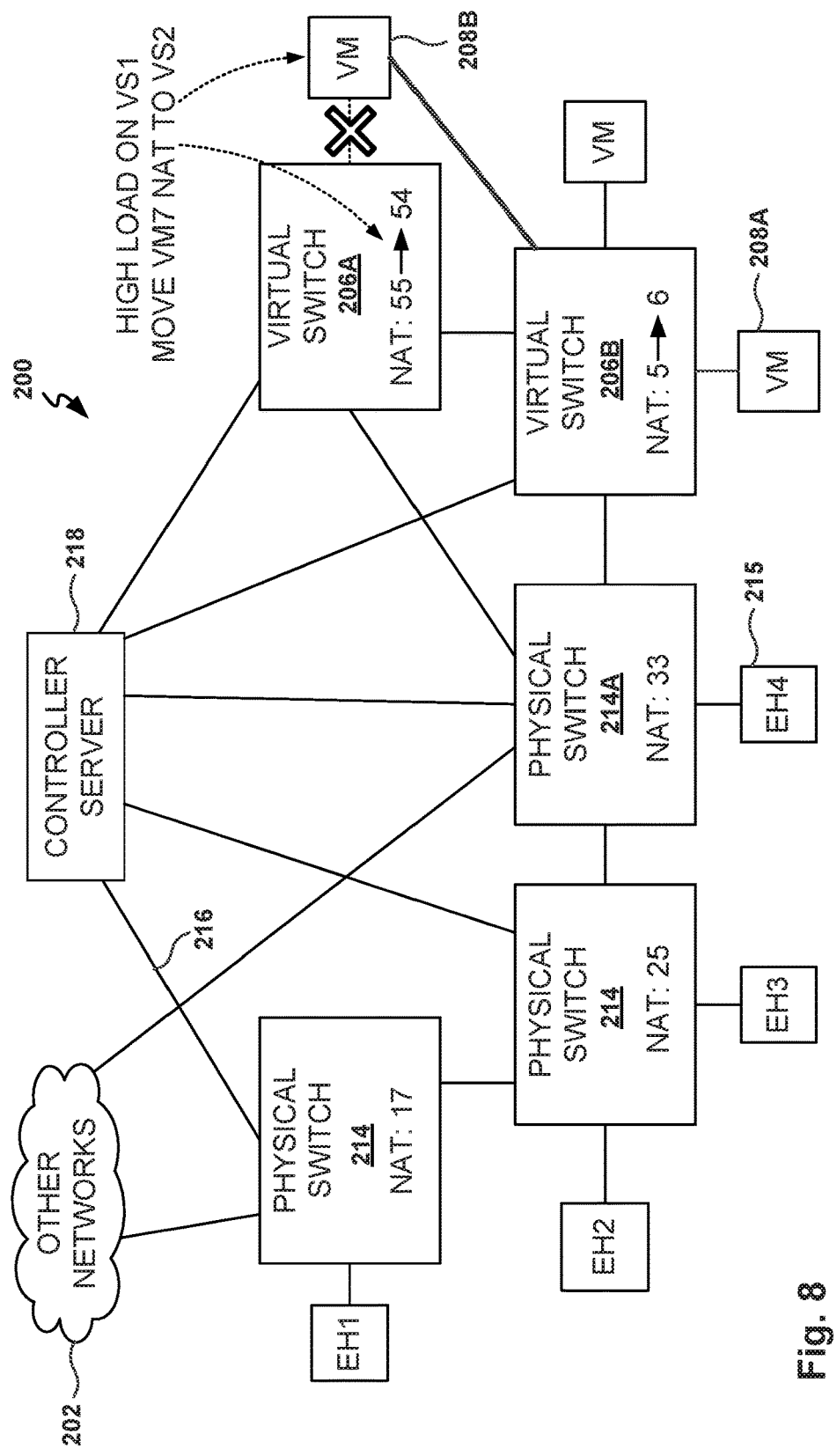
FIG. 8 illustrates NAT load-balancing operations, according to some example embodiments.

FIG. 8 illustrates NAT load-balancing operations, according to some example embodiments. FIG. 8 illustrates the migration of NAT operations from a first virtual switch to a second virtual switch, when the first virtual switch has a high NAT load. In the exemplary embodiment of FIG. 8, a virtual switch 206A is configured to perform NAT for a virtual machine (VM) 208B and a virtual switch 206B is configured to perform NAT for a VM 208A. The controller server 218 has detected that the virtual switch 206A has a high NAT load (e.g., performing NAT for 55 hosts or virtual machines), and the controller server 218 has determined to lower the load in the virtual switch 206A.

To decrease the load on the virtual switch 206A, the controller server 218 has determined to move NAT operations for the VM 208B from the virtual switch 206A to a virtual switch 206B. The controller server 218 propagates the updated configuration through the control plane to all the switches in the network fabric, or at least to the virtual switches 206A and 206B. After the change, NAT for the VM 208B will be performed by the virtual switch 206B, and the NAT load on the virtual switch 206A will be reduced by one (e.g., from 55 down to 54 in the embodiment of FIG. 8) and increased by one (e.g., from 5 up to 6) in virtual switch 206B.

Figure 9:
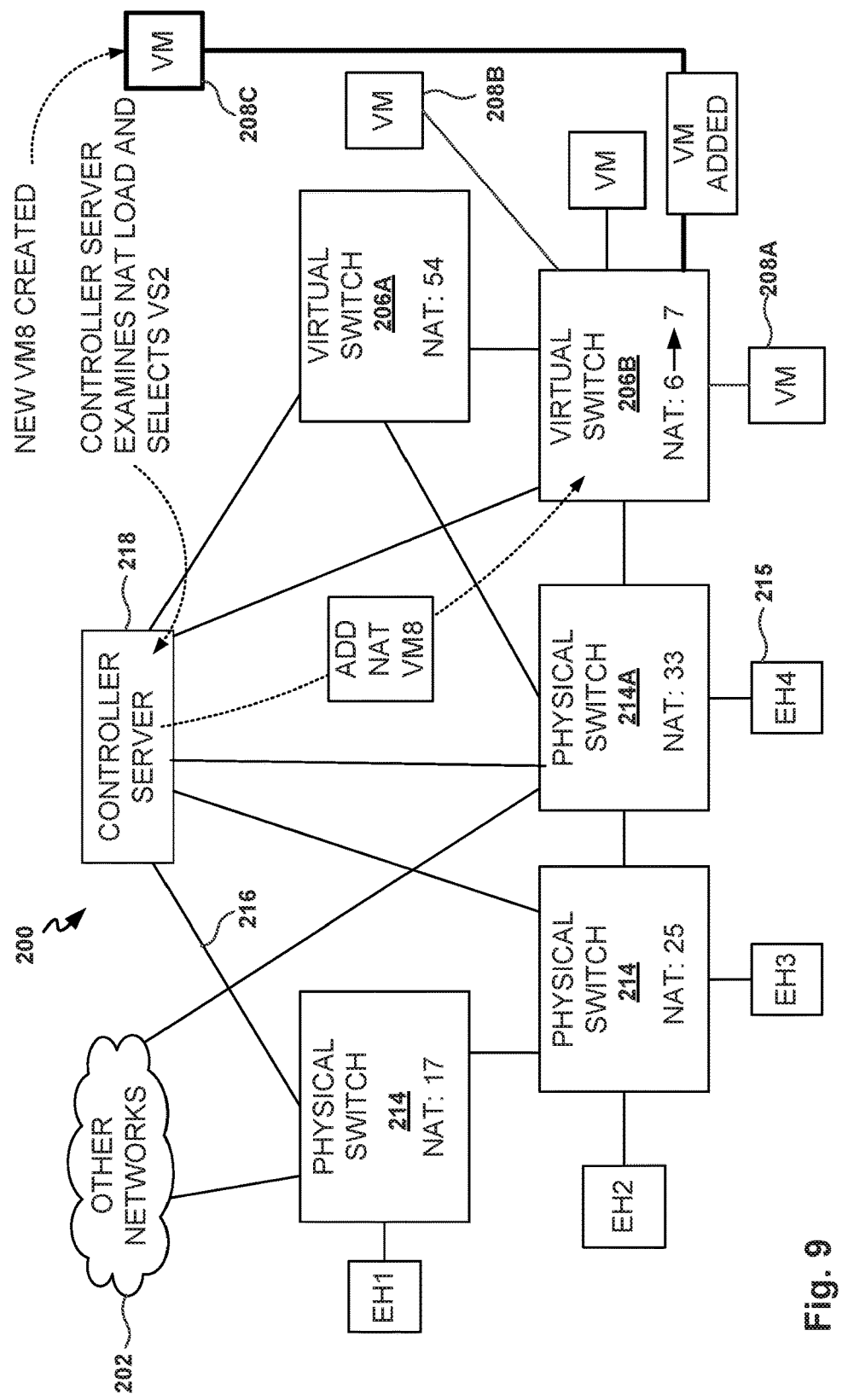
FIG. 9 illustrates the allocation of a virtual switch to a new virtual machine, according to some example embodiments.

FIG. 9 illustrates the allocation of a virtual switch to a new virtual machine, according to some example embodiments. When a new VM 208C is created, the controller server 218 assigns a switch for NAT for the new VM 208C. In the example embodiment of FIG. 9, the controller server 218 allocates the virtual switch 206B to the VM 208C. After the control plane is updated with the change, the NAT load is increased by one in the virtual switch 206B (e.g., from 6 to 7).

As discussed above, in one example embodiment, the virtual switch with the lowest NAT load is chosen for the new virtual machine. In some example embodiments, proximity to the switch is a determinant factor for selecting the switch for a new virtual machine. In some embodiments, a combination of NAT load and proximity are considered for selecting the switch. For example, having a virtual switch residing on the same host as the virtual machine may be the highest-priority factor, but other factors might also be considered.

In some example embodiments, a configuration utility is provided for the network administrator to configure network settings. The user interface is provided to set network parameters, including allocating switches to hosts for NAT. Of course, the network administrator may set up some NAT operations without completely configuring NAT for all hosts. In this case, the controller server 218 automatically allocates NAT switches that the network administrator does not specifically configure.

In some example embodiments, as new physical or virtual switches are added, the controller server 218 redistributes the allocation of NAT operations in order to better distribute the NAT load on the network fabric. In yet other example embodiments, a new virtual switch is created when the load on the network reaches a predetermined threshold. For example, if all virtual switches have a NAT load above 50, the controller server 218 spawns a new virtual switch to keep the NAT load below 50.

Figure 10:
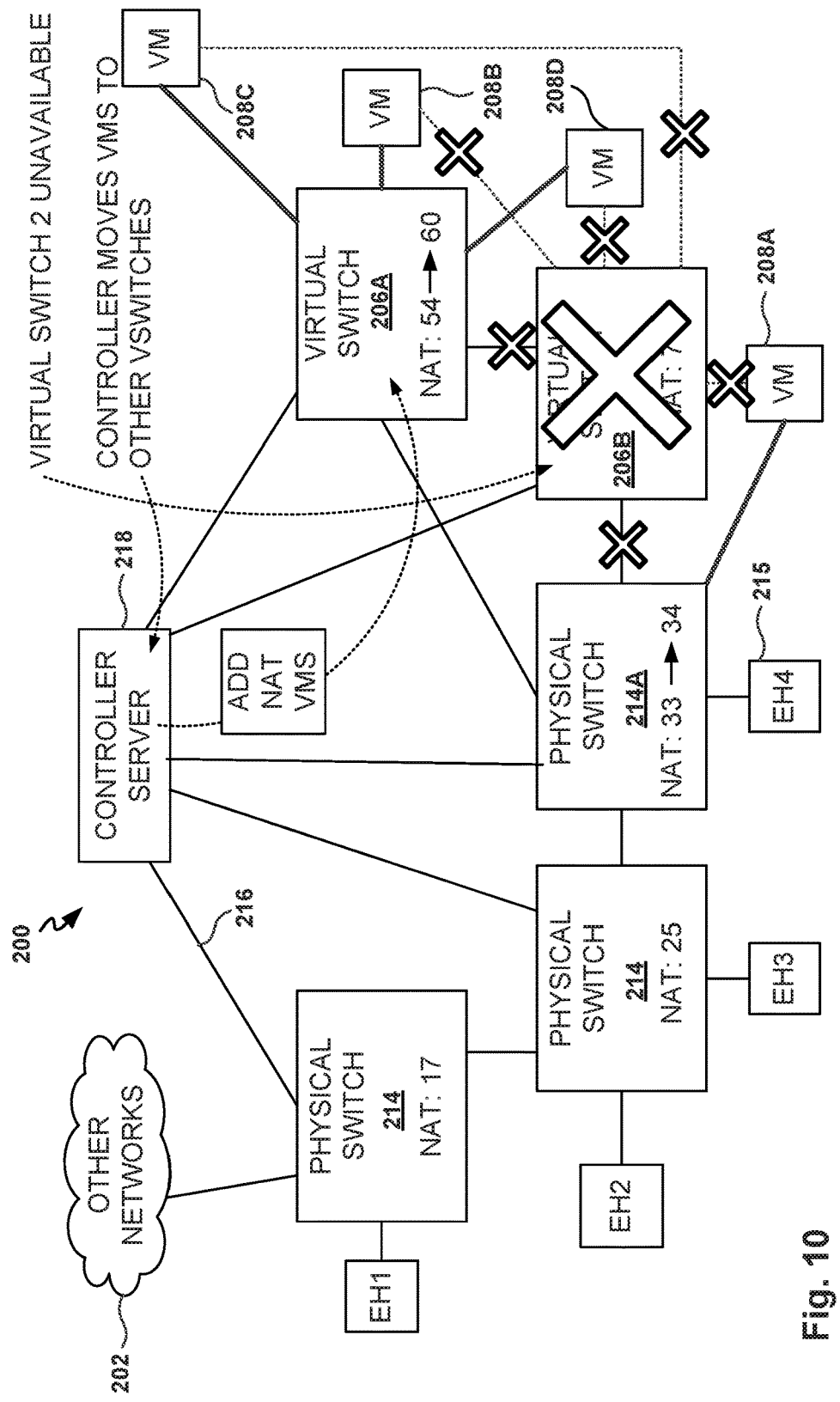
FIG. 10 illustrates reallocation of switches for performing NAT when a switch becomes unavailable, according to some example embodiments.

FIG. 10 illustrates reallocation of switches for performing NAT when a switch becomes unavailable, according to some example embodiments. When a switch becomes unavailable, the NAT load is automatically redistributed by the controller server 218 across the devices in the NAT pool. This includes reassigning the hosts using the unavailable switch to other switches for NAT.

The controller server 218 monitors the status of the switches on the network, and if the controller server 218 detects that a switch becomes unavailable (e.g., virtual switch 206B), then the controller server 218 reconfigures the fabric by reassigning the hosts that were using the unavailable switch for NAT to other switches. This way, device failure or planned downtime does not affect the ability of the network fabric to perform NAT.

In some example embodiments, network traffic disruptions are avoided for existing flows, which are using the unavailable NAT device, by synchronizing the state on the unavailable NAT device with the new NAT device using a shared database or the centralized controller server 218. For example, the shared database is shared using the control plane of the network fabric.

In one example embodiment, the controller server 218 keeps the state of the NAT flows at the switches on the network, and if one switch goes down, then the state is shared with other switches on the network. In another example embodiment, the switches in the network fabric share the state among themselves and with the controller server 218, so when a switch becomes unavailable, the other switches are able to quickly take over NAT operations without disruption to the existing flows.

In the exemplary embodiment of FIG. 10, the controller server 218 detects that the virtual switch 206B has become unavailable. As illustrated in FIG. 9, the virtual switch 206B was performing NAT for VMs 208A, 208B, 208C, and 208D, and others, and the NAT load was 7. In response to the unavailability of the virtual switch 206B, the controller server 218 reallocates NAT for the VMs. In this case, the VMs 208C, 208B, and 208D are reassigned to the virtual switch 206A, plus three other devices (not shown), and the virtual machine 208A is reassigned to the physical switch 214A. As a result, the counts of the NAT loads on the switches are adjusted.

Figure 11:
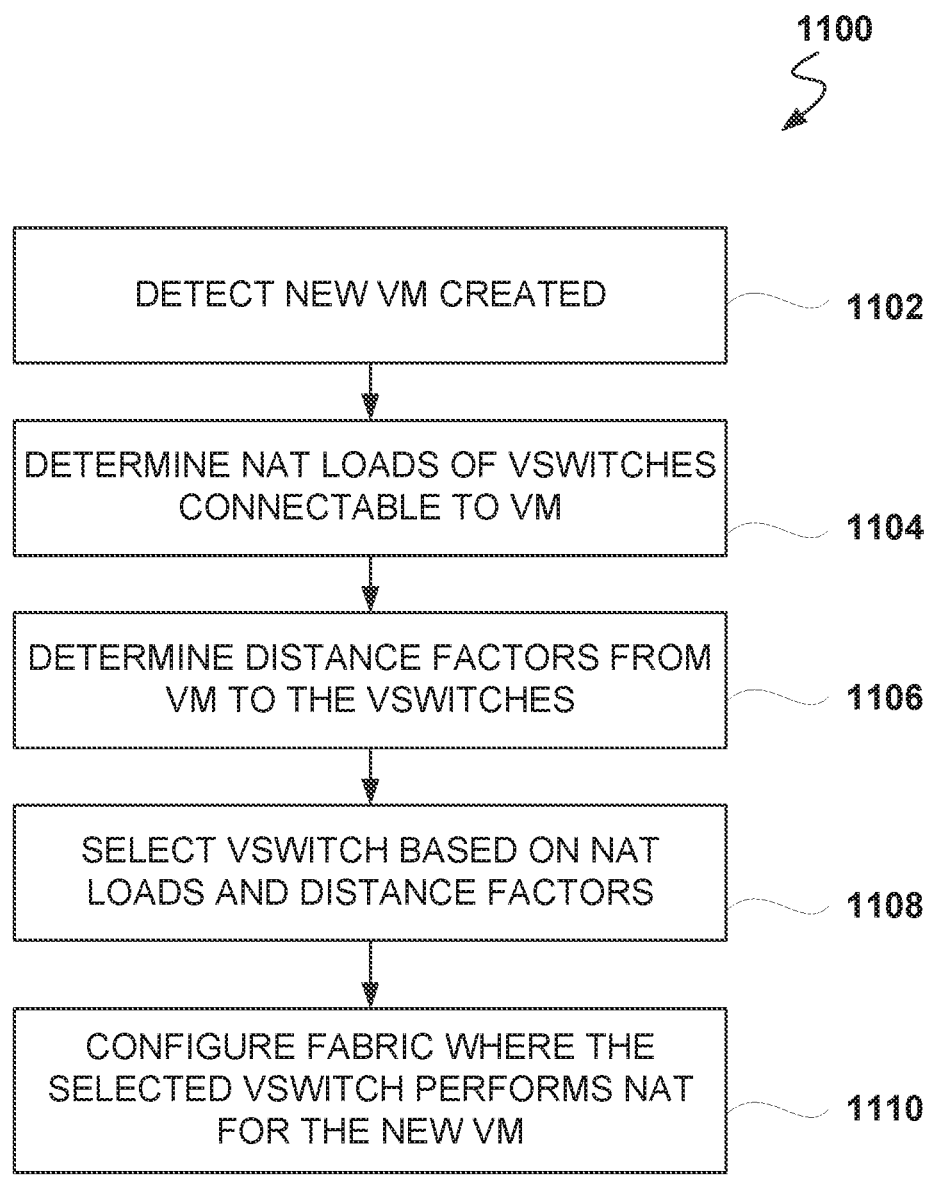
FIG. 11 is a flowchart of a method, according to some example embodiments, for allocating a virtual switch to a virtual machine.

FIG. 11 is a flowchart of a method 1100, according to some example embodiments, for allocating a virtual switch to a virtual machine. At operation 1102, the controller server 218 detects that a new virtual machine has been created in one of the hosts. From operation 1102, the method flows to operation 1104, where the controller server 218 determines the NAT loads on the virtual switches that may be in communication with the new virtual machine. In other example embodiments, physical switches and virtual switches are considered for NAT loads on the virtual machine.

At operation 1106, the controller server 218 determines distance factors related to the distance from the new virtual machine to the virtual switches that are candidates for performing NAT for the new virtual machine (e.g., number of network hops from the new VM to the virtual switch).

From operation 1106, the method flows to operation 1108, where the controller server 218 selects one of the virtual switches for performing NAT for the new virtual machine, based on the NAT loads on the virtual switches and the distance factors. At operation 1110, the network fabric is reconfigured such that the selected virtual switch performs NAT operations for the new virtual machine.

Figure 12:
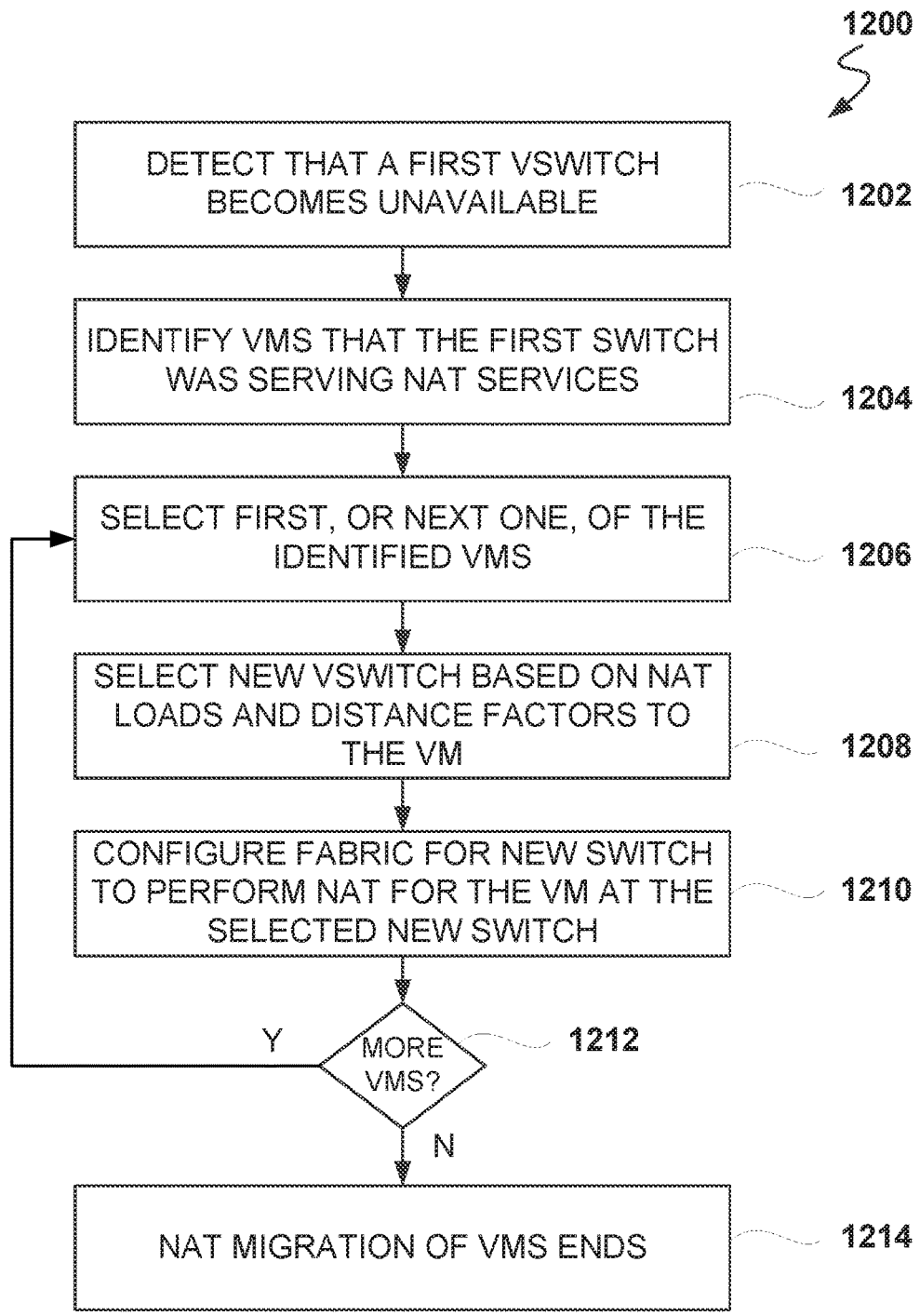
FIG. 12 is a flowchart of a method, according to some example embodiments, for disaster recovery after a switch becomes unavailable.

FIG. 12 is a flowchart of a method 1200, according to some example embodiments, for disaster recovery after a switch becomes unavailable. In operation 1202, the controller server 218 detects that a first virtual switch becomes unavailable (e.g., see example embodiment described above with reference to FIG. 10). For example, the first virtual switch may become unavailable because the first virtual switch crashed, or because the first virtual switch is shut down for maintenance. From operation 1202, the method flows to operation 1204, where the controller server 218 identifies the virtual machines (or any other hosts) that were being served by the unavailable switch for NAT operations.

In operation 1206, the controller server 218 selects the first, or the next, virtual machine to be migrated. In operation 1208, a new virtual switch is selected for the virtual machine that needs to be migrated, based on the loads on the virtual switches and distance factors from the virtual switches to the selected virtual machine.

From operation 1208, the method flows to operation 1210, where the network fabric is configured (e.g., physical and virtual switches) such that the selected new virtual switch is configured to perform NAT for the selected virtual machine. In some example embodiments, configuring the network fabric includes sending control messages over the control plane to one or more of the switches controlled by the controller server 218.

From operation 1210, the method flows to operation 1212, where a check is made to determine if more virtual machines need to be migrated to a new switch. If there are more virtual machines that need to be migrated, the method flows back to operation 1206, and if there are no more virtual machines that need migration, the method flows to operation 1214. In operation 1214, the NAT migration of virtual machines ends.

Figure 13:
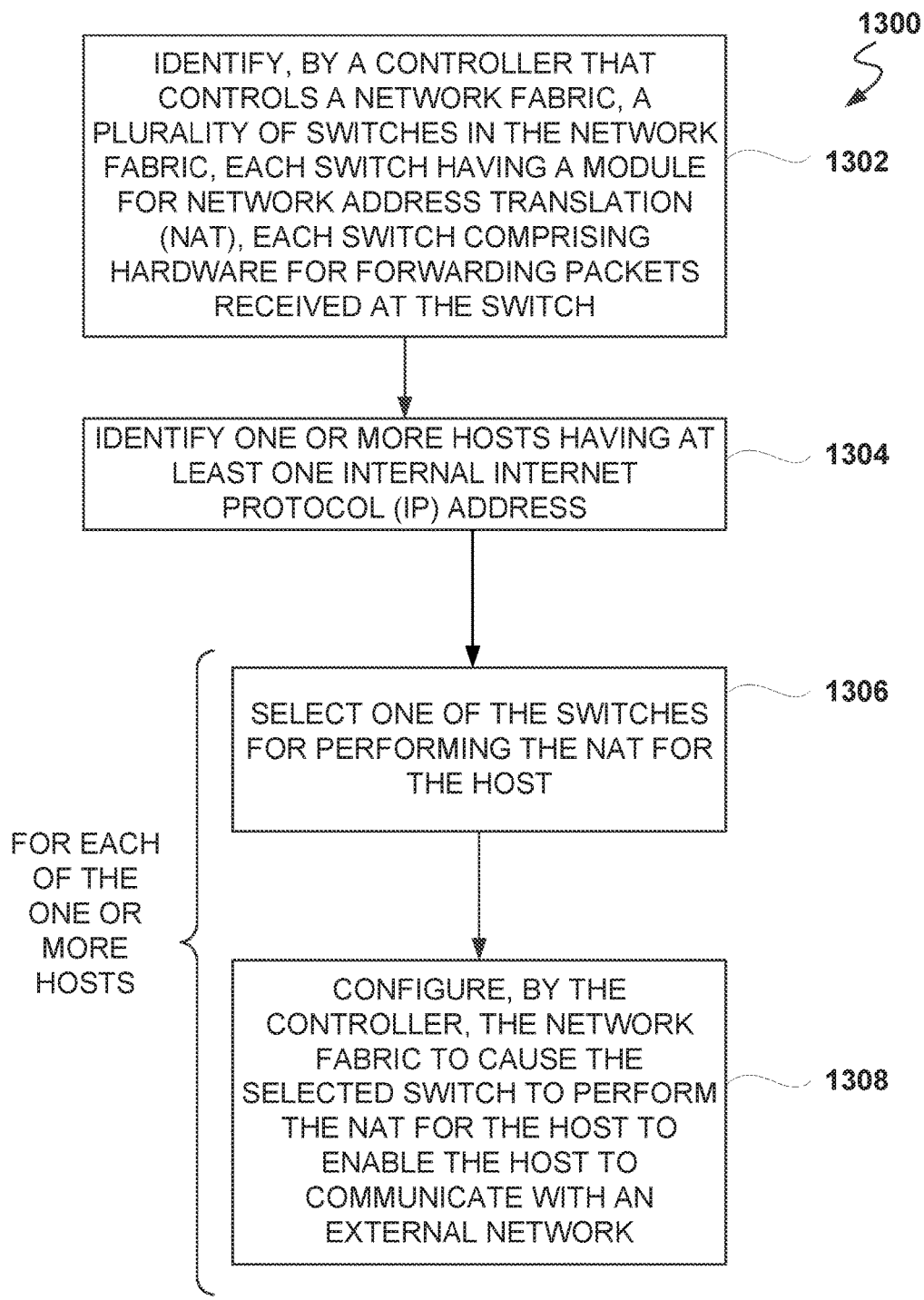
FIG. 13 is a flowchart of a method, according to some example embodiments, for distributing NAT operations to a plurality of network devices on a network.

FIG. 13 is a flowchart of a method 1300, according to some example embodiments, for distributing NAT operations to a plurality of network devices on a network. In operation 1302, a controller that controls a network fabric identifies a plurality of switches in the network fabric, each switch having a module for NAT, and each switch comprising hardware for forwarding packets received at the switch.

From operation 1302, the method flows to operation 1304, where one or more hosts having at least one internal IP address are identified. For each of the one or more hosts identified in operation 1304, the method performs operations 1306 and 1308.

Operation 1306 is for selecting one of the switches for performing the NAT for the host. Further, in operation 1308, the controller configures the network fabric to cause the selected switch to perform the NAT for the host to enable the host to communicate with an external network.

In one example embodiment, the method 1300 further includes detecting a new virtual machine connected to the network fabric; selecting one of the switches from the plurality of switches for performing the NAT for the new virtual machine, the selecting being based on a load on each switch for performing the NAT and a distance from the new virtual machine to each of the switches, where the distance is measured as a number of network hops between the new virtual machine and the switch; and configuring, by the controller, the network fabric to cause the selected switch to perform the NAT for the new virtual machine.

In another aspect, the method 1300 further comprises detecting that a first switch, that is performing the NAT for one or more hosts, is offline; determining for which hosts the first switch is configured to perform the NAT; and migrating each of the determined hosts to another switch for performing the NAT.

In one example embodiment, the selecting of one of the switches from the plurality of switches is further based on a distance from the switch to the host. In another example embodiment, the method 1300 further comprises tracking the load on each switch for performing the NAT; detecting a switch that is overloaded; and moving, in response to the detecting, one or more hosts from the switch that is overloaded to other switches for performing the NAT on the corresponding hosts.

In one example embodiment, the controller comprises a switch table stored in memory, the switch table comprising switch information comprising a switch identifier; a NAT load on the switch; and a location of the switch. In another example embodiment, the controller comprises a host table stored in memory, the host table comprising host information comprising a host identifier; a flag indicating if the host is a device or a virtual machine; an identification of the switch performing the NAT for the host; and a location of the host.

In another aspect, each switch includes a control unit program that is in communication with the controller. In another example embodiment, when a host is connected to a network device inoperable to perform the NAT, the traffic from the host is routed to one of the switches for performing the NAT for the host. In some example embodiments, the module for NAT performs floating IP NAT and PAT NAT.

Figure 14:
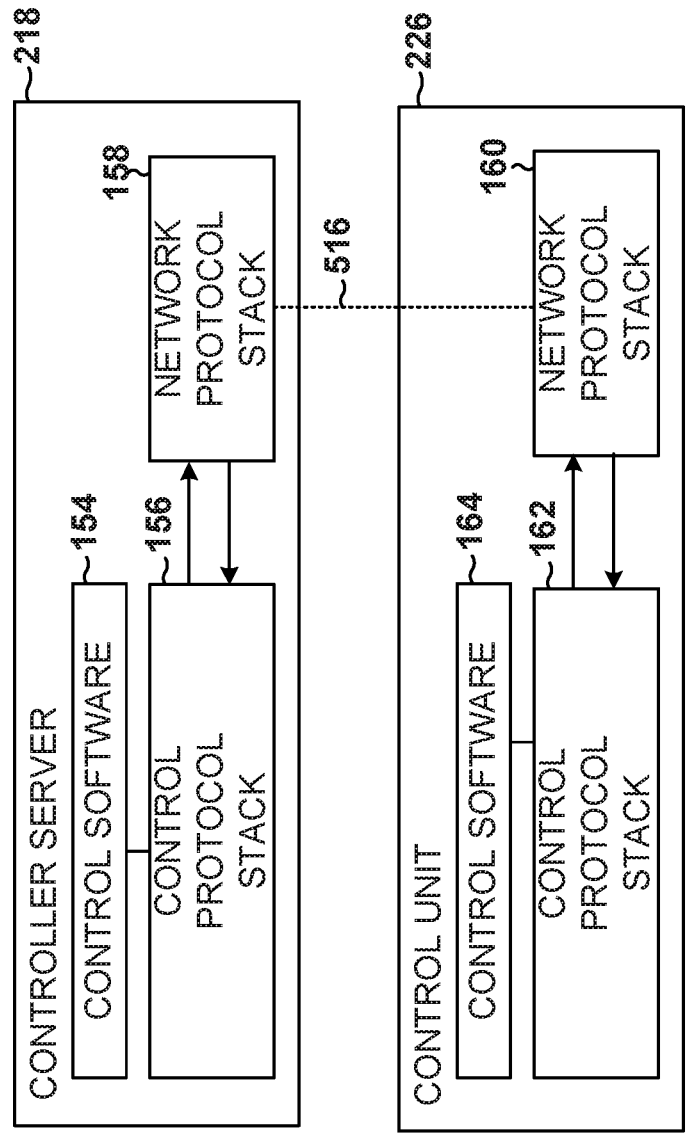
FIG. 14 is a block diagram of a controller server and controller client, according to an example embodiment.

FIG. 14 is a block diagram of a controller server 218 and control unit 226, according to an embodiment. The controller server 218 and the control unit 226 may communicate over network paths 516 using network protocol stacks such as a network protocol stack 158 and a network protocol stack 160. The network protocol stacks 158 and 160 may be, for example Linux™ TCP/IP stacks or the TCP/IP stack in the VxWorks™ operating system (as examples). The network path 516 may be, for example, a connection between the physical switch 214 and external equipment or may be a backbone path in a rack-based system.

A control protocol stack 156 serves as an interface between the network protocol stack 158 and control software 154. A control protocol stack 162 serves as an interface between the network protocol stack 160 and control software 164. During operation, when the controller server 218 is communicating with the control unit 226, the control protocol stacks 156 and 162 generate and parse control protocol messages (e.g., control messages to configure NAT operations at fabric switches). By using arrangements of the type shown in FIG. 2, a network connection is formed over the network path 516 between the controller server 218 and the control unit 226. The controller server 218 and the control unit 226 can communicate using a Transmission Control Protocol (TCP) or User Datagram Protocol (UDP) over Internet Protocol (IP) network connection. Examples of control protocols that may be used when communicating between the controller server 218 and the control unit 226 over the network connection include Simple Network Management Protocol (SNMP) and OpenFlow protocol stack.

Figure 15:
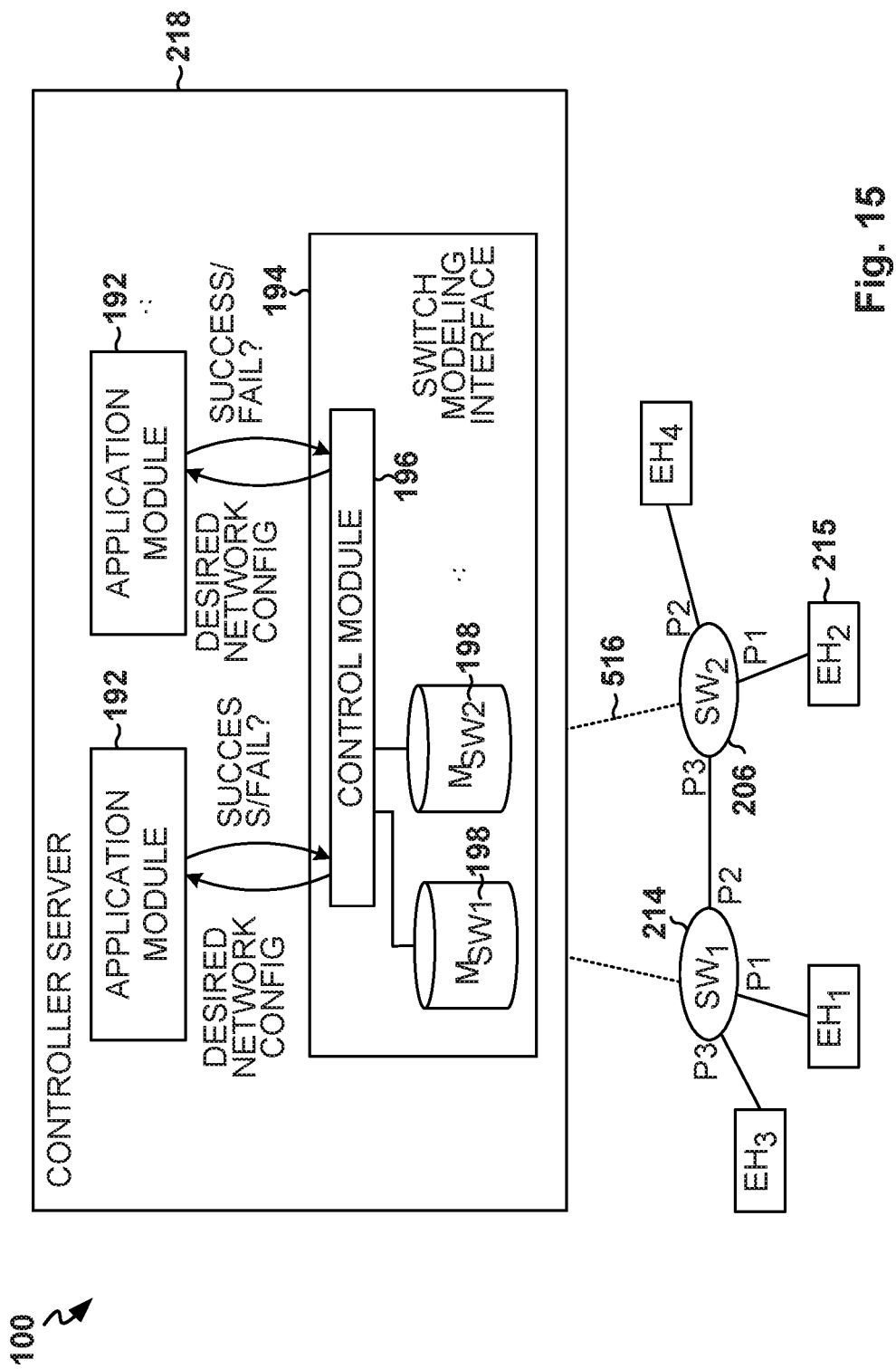
FIG. 15 is a block diagram illustrating the network, according to an example embodiment.

FIG. 15 is a block diagram illustrating a network 100, according to an embodiment. The network 100 is utilized to exemplify a configuration of a multi-vendor network, according to an example embodiment. The network 100 includes switches 206 and 214 that may be controlled by the controller server 218. The controller server 218 may be a single device or be a distributed controller implemented across multiple computing devices. The network 100 may include a physical switch SW1 214 and a virtual switch SW2 206, according to an example embodiment. The controller server 218 may be coupled to the switches 214 and 206 of the network 100 via the network paths 516, and control the switches 214 and 206 using the network paths 516. The switches 214 and 206 may include switch ports (physical or virtual) that are coupled to end hosts or to other switches. In the example of FIG. 15, end hosts EH1 and EH3 are coupled to respective ports P1 and P3 of the physical switch SW1 214, end hosts EH2 215 and EH4 are coupled to respective ports P1 and P2 of the virtual switch SW2 206, and the switches SW1 214 and SW2 206 are coupled via port P2 of switch SW1 214 and port P3 of switch SW2 206.

The controller server 218 may include one or more application modules 192 that control the operations of switches in a network. For example, a first application module 192 may organize switches into virtual switches formed from groups of end hosts or ports on the switches.

The first application module 192 may control the underlying switches SW1 214 and SW2 206 of the network 100 in enforcing network policy and packet forwarding at the virtual switch level (e.g., the network policies may be defined for virtual switches and not the underlying switches). As another example, a second application module 192 may handle network-monitoring functions such as analyzing network traffic to generate network traffic reports. The application modules 192 may generate and provide desired network configurations (e.g., for all or part of the network 100) to a switch modeling interface 194. The switch modeling interface 194 may use switch models 198 in implementing the desired network configurations and may indicate to the application modules 192 whether the implementation is successful or has failed. In yet another example, a third application module 192 (not shown) may be the NAT controller 502 illustrated in FIG. 5.

The application modules 192 may be implemented at the controller server 218 as software on general-purpose hardware, or as application-specific computing equipment, or as dedicated hardware. For example, the application modules 192 may be implemented as software modules on shared computing equipment. As another example, the application modules 192 may be implemented on different computing equipment in a distributed controller arrangement.

The application modules 192 may control switches based on network topology information maintained at the application modules 192 or maintained by other modules of the controller server 218. However, there may be hundreds, thousands, or more switches in a network. It can be challenging for the application modules 192 to ensure that control messages sent to the switches of a network are successfully received or executed by the switches. In addition, multiple application modules 192 may be implemented at a controller server 218 and potentially conflict with each other. Considering a scenario in which a switch fails to implement a flow table entry received from the controller server 218, the state of the switch may not match the expected state and subsequent flow table entries provided by the controller server 218 may produce an undesired network configuration.

The controller server 218 may be provided with the switch modeling interface 194 that handles communications with the switches and maintenance of switch states. The switch modeling interface 194 may help to ensure that the application modules 192 are synchronized with the switches of the network. The switch modeling interface 194 may be utilized to implement the switch models 198 that represent each switch in the network 100. For example, switch model MSW1 may represent switch SW1 214, whereas switch model MSW2 may represent switch SW2 206. Switch models MSW1 and MSW2 may maintain information on the current state of respective switches SW1 214 and SW2 206. For example, switch model MSW1 may maintain information identifying the forwarding rules or policies that are implemented at switch SW1 214, whereas switch model MSW2 may identify the state of switch SW2 206.

The switch models 198 may be controlled by a control module 196. The control module 196 may control the switch models 198 and issue control messages to switches of the network 100 in fulfilling network control requests from the application modules 192. The switch models 198 may be implemented as a data construct such as a set of tables.

Figure 16:
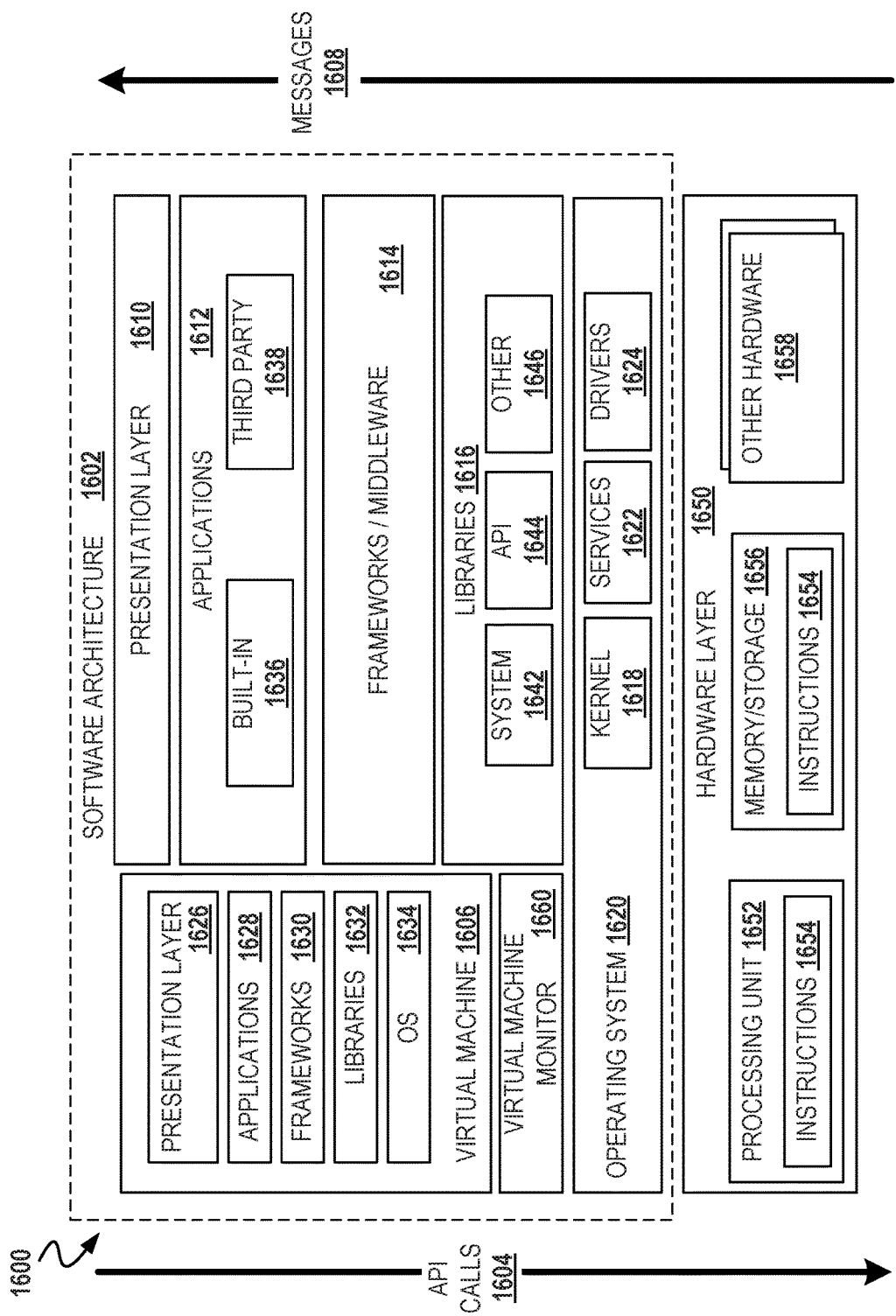
FIG. 16 is a block diagram illustrating an example of a software architecture that may be installed on a machine, according to some example embodiments.

FIG. 16 is a block diagram 1600 illustrating a representative software architecture 1602, which may be used in conjunction with various hardware architectures herein described. FIG. 16 is merely a non-limiting example of a software architecture 1602 and it will be appreciated that many other architectures may be implemented to facilitate the functionality described herein. The software architecture 1602 may be executing on hardware such as a machine 1700 of FIG. 17 that includes, among other things, processors 1704, memory/storage 1706, and I/O components 1718. A representative hardware layer 1650 is illustrated and can represent, for example, the machine 1700 of FIG. 17. The representative hardware layer 1650 comprises one or more processing units 1652 having associated executable instructions 1654. The executable instructions 1654 represent the executable instructions of the software architecture 1602, including implementation of the methods, modules, and so forth of FIGS. 1-15. The hardware layer 1650 also includes memory and/or storage modules 1656, which also have the executable instructions 1654. The hardware layer 1650 may also comprise other hardware 1658, which represents any other hardware of the hardware layer 1650, such as the other hardware illustrated as part of the machine 1700.

In the example architecture of FIG. 16, the software architecture 1602 may be conceptualized as a stack of layers where each layer provides particular functionality. For example, the software architecture 1602 may include layers such as an operating system 1620, libraries 1616, frameworks/middleware 1614, applications 1612, and a presentation layer 1610. Operationally, the applications 1612 and/or other components within the layers may invoke application programming interface (API) calls 1604 through the software stack and receive a response, returned values, and so forth illustrated as messages 1608 in response to the API calls 1604. The layers illustrated are representative in nature and not all software architectures have all layers. For example, some mobile or special purpose operating systems may not provide a frameworks/middleware layer 1614, while others may provide such a layer. Other software architectures may include additional or different layers.

The operating system 1620 may manage hardware resources and provide common services. The operating system 1620 may include, for example, a kernel 1618, services 1622, and drivers 1624. The kernel 1618 may act as an abstraction layer between the hardware and the other software layers. For example, the kernel 1618 may be responsible for memory management, processor management (e.g., scheduling), component management, networking, security settings, and so on. The services 1622 may provide other common services for the other software layers. The drivers 1624 may be responsible for controlling or interfacing with the underlying hardware. For instance, the drivers 1624 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1616 may provide a common infrastructure that may be utilized by the applications 1612 and/or other components and/or layers. The libraries 1616 typically provide functionality that allows other software modules to perform tasks in an easier fashion than to interface directly with the underlying operating system 1620 functionality (e.g., kernel 1618, services 1622, and/or drivers 1624). The libraries 1616 may include system libraries 1642 (e.g., C standard library) that may provide functions such as memory allocation functions, string manipulation functions, mathematic functions, and the like. In addition, the libraries 1616 may include API libraries 1644 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1616 may also include a wide variety of other libraries 1646 to provide many other APIs to the applications 1612 and other software components/modules.

The frameworks 1614 (also sometimes referred to as middleware) may provide a higher-level common infrastructure that may be utilized by the applications 1612 and/or other software components/modules. For example, the frameworks 1614 may provide various graphic user interface (GUI) functions, high-level resource management, high-level location services, and so forth. The frameworks 1614 may provide a broad spectrum of other APIs that may be utilized by the applications 1612 and/or other software components/modules, some of which may be specific to a particular operating system or platform.

The applications 1612 include built-in applications 1636 and/or third-party applications 1638. Examples of representative built-in applications 1636 may include, but are not limited to, a contacts application, a browser application, a book reader application, a location application, a media application, a messaging application, and/or a game application. The third-party applications 1638 may include any of the built-in applications 1636 as well as a broad assortment of other applications. In a specific example, the third-party application 1638 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third-party application 1638 may invoke the API calls 1604 provided by the mobile operating system such as operating system 1620 to facilitate functionality described herein.

The applications 1612 may utilize built-in operating system functions (e.g., kernel 1618, services 1622, and/or drivers 1624), libraries (e.g., system libraries 1642, API libraries 1644, and other libraries 1646), or frameworks/middleware 1614 to create user interfaces to interact with users of the system. Alternatively, or additionally, in some systems interactions with a user may occur through a presentation layer, such as the presentation layer 1610. In these systems, the application/module "logic" can be separated from the aspects of the application/module that interact with a user.

Some software architectures utilize virtual machines. In the example of FIG. 16, this is illustrated by a virtual machine 1606. A virtual machine creates a software environment where applications/modules can execute as if they were executing on a hardware machine (such as the machine 1700 of FIG. 17, for example). The virtual machine 1606 is hosted by a host operating system (e.g., operating system 1620 in FIG. 16) and typically, although not always, has a virtual machine monitor 1660, which manages the operation of the virtual machine 1606 as well as the interface with the host operating system (e.g., operating system 1620). A software architecture executes within the virtual machine 1606 such as an operating system 1634, libraries 1632, frameworks/middleware 1630, applications 1628, and/or a presentation layer 1626. These layers of software architecture executing within the virtual machine 1606 can be the same as corresponding layers previously described or may be different.

Figure 17:
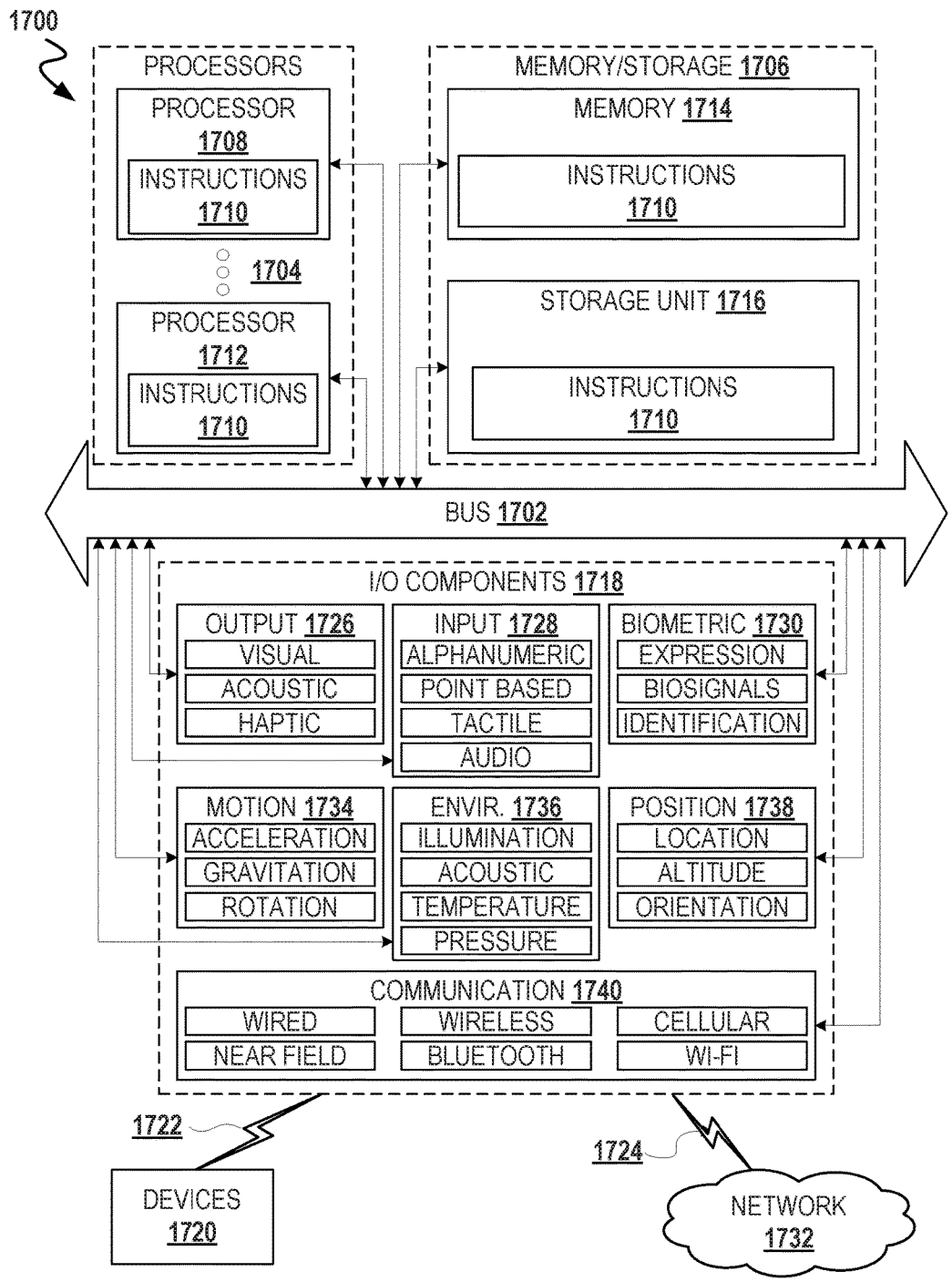
FIG. 17 illustrates a diagrammatic representation of a machine in the form of a computer system within which a set of instructions may be executed for causing the machine to perform any one or more of the methodologies discussed herein, according to an example embodiment.

FIG. 17 is a block diagram illustrating components of a machine 1700, according to some example embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1710 (e.g., software, a program, an application, an applet, an app, or other executable code) for causing the machine 1700 to perform any one or more of the methodologies discussed herein may be executed. For example, the instructions 1710 may cause the machine 1700 to execute the flow diagrams of FIGS. 11-13. Additionally, or alternatively, the instructions 1710 may implement the computing equipment 212 (hosting the controller server 218), physical switches 214, and virtual switches 206 of FIGS. 2-5, 7-10, and 14-15, and so forth. The instructions 1710 transform the general, non-programmed machine 1700 into a particular machine 1700 programmed to carry out the described and illustrated functions in the manner described.

In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a switch, a controller server, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1710, sequentially or otherwise, that specify actions to be taken by the machine 1700. Further, while only a single machine 1700 is illustrated, the term "machine" shall also be taken to include a collection of machines 1700 that individually or jointly execute the instructions 1710 to perform any one or more of the methodologies discussed herein.

The machine 1700 may include processors 1704, memory/storage 1706, and I/O components 1718, which may be configured to communicate with each other such as via a bus 1702. In an example embodiment, the processors 1704 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1708 and a processor 1712 that may execute the instructions 1710. The term "processor" is intended to include multi-core processors that may comprise two or more independent processors (sometimes referred to as "cores") that may execute instructions contemporaneously. Although FIG. 17 shows multiple processors 1704, the machine 1700 may include a single processor with a single core, a single processor with multiple cores (e.g., a multi-core processor), multiple processors with a single core, multiple processors with multiples cores, or any combination thereof.

The memory/storage 1706 may include a memory 1714, such as a main memory, or other memory storage, and a storage unit 1716, both accessible to the processors 1704 such as via the bus 1702. The storage unit 1716 and memory 1714 store the instructions 1710 embodying any one or more of the methodologies or functions described herein. The instructions 1710 may also reside, completely or partially, within the memory 1714, within the storage unit 1716, within at least one of the processors 1704 (e.g., within the processor's cache memory), or any suitable combination thereof, during execution thereof by the machine 1700. Accordingly, the memory 1714, the storage unit 1716, and the memory of the processors 1704 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1710. The term "machine-readable medium" shall also be taken to include any medium, or combination of multiple media, that is capable of storing instructions (e.g., instructions 1710) for execution by a machine (e.g., machine 1700), such that the instructions, when executed by one or more processors of the machine (e.g., processors 1704), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1718 may include a wide variety of components to receive input, provide output, produce output, transmit information, exchange information, capture measurements, and so on. The specific I/O components 1718 that are included in a particular machine will depend on the type of machine. For example, portable machines such as mobile phones will likely include a touch input device or other such input mechanisms, while a headless server machine will likely not include such a touch input device. It will be appreciated that the I/O components 1718 may include many other components that are not shown in FIG. 17. The I/O components 1718 are grouped according to functionality merely for simplifying the following discussion, and the grouping is in no way limiting. In various example embodiments, the I/O components 1718 may include output components 1726 and input components 1728. The output components 1726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1718 may include biometric components 1730, motion components 1734, environmental components 1736, or position components 1738 among a wide array of other components. For example, the biometric components 1730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1734 may include acceleration sensor components (e.g., accelerometer), gravitation sensor components, rotation sensor components (e.g., gyroscope), and so forth. The environmental components 1736 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1738 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1718 may include communication components 1740 operable to couple the machine 1700 to a network 1732 or devices 1720 via a coupling 1724 and a coupling 1722 respectively. For example, the communication components 1740 may include a network interface component or other suitable device to interface with the network 1732. In further examples, the communication components 1740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1720 may be another machine or any of a wide variety of peripheral devices (e.g., a peripheral device coupled via a USB).

Moreover, the communication components 1740 may detect identifiers or include components operable to detect identifiers. For example, the communication components 1740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1740, such as location via Internet Protocol (IP) geo-location, location via Wi-Fi® signal triangulation, location via detecting an NFC beacon signal that may indicate a particular location, and so forth.

In various example embodiments, one or more portions of the network 1732 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1732 or a portion of the network 1732 may include a wireless or cellular network and the coupling 1724 may be a Code Division Multiple Access (CDMA) connection, a Global System for Mobile communications (GSM) connection, or another type of cellular or wireless coupling. In this example, the coupling 1724 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1710 may be transmitted or received over the network 1732 using a transmission medium via a network interface device (e.g., a network interface component included in the communication components 1740) and utilizing any one of a number of well-known transfer protocols (e.g., hypertext transfer protocol (HTTP)). Similarly, the instructions 1710 may be transmitted or received using a transmission medium via the coupling 1722 (e.g., a peer-to-peer coupling) to the devices 1720. The term "transmission medium" shall be taken to include any intangible medium that is capable of storing, encoding, or carrying the instructions 1710 for execution by the machine 1700, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   identifying, by a controller that controls a network fabric, a plurality of switches in the network fabric, each switch having a module for network address translation (NAT), each switch being configured for forwarding packets received at the switch;
   identifying one or more hosts having at least one internal Internet Protocol (IP) address, and for each of the one or more hosts:
      selecting one of the switches from the plurality of switches for performing the NAT for the host, and
      configuring, by the controller, the network fabric to cause the selected switch to perform the NAT for the host to enable the host to communicate with an external network;
   detecting a new virtual machine connected to the network fabric; and
   selecting one of the switches from the plurality of switches for performing the NAT for the new virtual machine, the selecting being based, at least, on a load on each switch for performing the NAT and a distance from the new virtual machine to each of the switches.

2. The method as recited in claim 1,
   wherein the distance is measured as a number of network hops between the new virtual machine and the switch; and
   further comprising configuring, by the controller, the network fabric to cause the selected switch to perform the NAT for the new virtual machine.

3. The method as recited in claim 1, further comprising:
   detecting that a first switch, that is performing the NAT for one or more hosts, is offline;
   determining for which hosts the first switch is configured to perform the NAT; and
   migrating each of the determined hosts to another switch for performing the NAT.

4. The method as recited in claim 1, wherein the selecting of one of the switches from the plurality of switches is further based on a distance from the switch to the host.

5. The method as recited in claim 1, further comprising:
tracking a load on each switch for performing the NAT;
detecting a switch that is overloaded; and
moving, in response to the detecting, one or more hosts from the switch that is overloaded to other switches for performing the NAT on the corresponding hosts.

6. The method as recited in claim 1, wherein the controller comprises a switch table stored in memory, the switch table comprising switch information comprising a switch identifier, a NAT load on the switch, and a location of the switch.

7. The method as recited in claim 1, wherein the controller comprises a host table stored in memory, the host table comprising host information comprising a host identifier, a flag indicating if the host is a device or a virtual machine, an identification of the switch performing the NAT for the host, and a location of the host.

8. The method as recited in claim 1, wherein each switch comprises a control unit program that is in communication with the controller.

9. The method as recited in claim 1, wherein, when a host is connected to a network device inoperable to perform the NAT, traffic from the host is routed to one of the switches for performing the NAT for the host.

10. The method as recited in claim 1, wherein the module for NAT performs floating IP NAT and port address translation (PAT) NAT.

11. A non-transitory machine-readable storage medium comprising instructions that, when executed by a machine, cause the machine to perform operations comprising:
identifying, by a controller that controls a network fabric, a plurality of switches in the network fabric, each switch having a module for network address translation (NAT), each switch being configured for forwarding packets received at the switch;
identifying one or more hosts having at least one internal Internet Protocol (IP) address, and for each of the one or more hosts:
selecting one of the switches from the plurality of switches for performing the NAT for the host, and
configuring, by the controller, the network fabric to cause the selected switch to perform the NAT for the host to enable the host to communicate with an external network;
detecting a new virtual machine connected to the network fabric; and
selecting one of the switches from the plurality of switches for performing the NAT for the new virtual machine, the selecting being based, at least, on a load on each switch for performing the NAT and a distance from the new virtual machine to each of the switches.

12. The machine-readable storage medium as recited in claim 11, wherein
the distance is measured as a number of network hops between the new virtual machine and the switch; and
wherein the machine further performs operations comprising:
configuring, by the controller, the network fabric to cause the selected switch to perform the NAT for the new virtual machine.

13. The machine-readable storage medium as recited in claim 11, wherein the machine further performs operations comprising:
detecting that a first switch, that is performing the NAT for one or more hosts, is offline;
determining for which hosts the first switch is configured to perform the NAT; and
migrating each of the determined hosts to another switch for performing the NAT.

14. The machine-readable storage medium as recited in claim 11, wherein the selecting of one of the switches from the plurality of switches is further based on a distance from the switch to the host.

15. The machine-readable storage medium as recited in claim 11, wherein the machine further performs operations comprising:
tracking a load on each switch for performing the NAT;
detecting a switch that is overloaded; and
moving, in response to the detecting, one or more hosts from the switch that is overloaded to other switches for performing the NAT on the corresponding hosts.

16. A controller comprising:
a network interface;
a memory comprising instructions; and
one or more computer processors, wherein the instructions, when executed by the one or more computer processors, cause the one or more computer processors to perform operations comprising:
identifying a plurality of switches in a network fabric, each switch having a module for network address translation (NAT), each switch being configured for forwarding packets received at the switch;
identifying one or more hosts having at least one internal Internet Protocol (IP) address, and for each of the one or more hosts:
selecting one of the switches from the plurality of switches for performing the NAT for the host, and
configuring the network fabric to cause the selected switch to perform the NAT for the host to enable the host to communicate with an external network;
detecting a new virtual machine connected to the network fabric; and
selecting one of the switches from the plurality of switches for performing the NAT for the new virtual machine, the selecting being based on a load on each switch for performing the NAT and a distance from the new virtual machine to each of the switches.

17. The controller as recited in claim 16, wherein the memory comprises a switch table, the switch table comprising switch information comprising a switch identifier, a NAT load on the switch, and a location of the switch.

18. The controller as recited in claim 16, wherein the memory comprises a host table, the host table comprising host information comprising a host identifier, a flag indicating if the host is a device or a virtual machine, an identification of the switch performing the NAT for the host, and a location of the host.

19. The controller as recited in claim 16,
wherein the distance is measured as a number of network hops between the new virtual machine and the switch; and wherein the instructions further cause the one or more processors to perform operations comprising configuring, by the controller, the network fabric to cause the selected switch to perform the NAT for the virtual machine.

20. The controller as recited in claim 16, wherein the instructions further cause the one or more processors to perform operations comprising:
detecting that a first switch, that is performing the NAT for one or more hosts, is offline;

determining for which hosts the first switch is configured to perform the NAT; and migrating each of the determined hosts to another switch for performing the NAT.

\* \* \* \* \*